US011501636B2

(12) United States Patent
 Xie

(10) Patent No.: US 11,501,636 B2
(45) Date of Patent: Nov. 15, 2022

(54) ROAD SEGMENT SPEED PREDICTION METHOD, APPARATUS, SERVER, MEDIUM, AND PROGRAM PRODUCT

(71) Applicant: TENCENT TECHNOLOGY (SHENZHEN) COMPANY LIMITED, Shenzhen (CN)

(72) Inventor: Zhenzhuo Xie, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 481 days.

(21) Appl. No.: 16/598,108

(22) Filed: Oct. 10, 2019

(65) Prior Publication Data
 US 2020/0105133 A1  Apr. 2, 2020

Related U.S. Application Data

(63) Continuation of application No. PCT/CN2018/109688, filed on Oct. 10, 2018.

(30) Foreign Application Priority Data

Oct. 25, 2017  (CN) .......................... 201711014944.4

(51) Int. Cl.
 *G08G 1/01*  (2006.01)
 *G06N 20/00*  (2019.01)
  (Continued)

(52) U.S. Cl.
 CPC ............. *G08G 1/0129* (2013.01); *G06N 5/04* (2013.01); *G06N 20/00* (2019.01); *G08G 1/012* (2013.01); *G01C 21/3415* (2013.01)

(58) Field of Classification Search
 CPC .. G08G 1/0129; G08G 1/012; G01C 21/3415; G06N 20/00; G06N 20/04
 See application file for complete search history.

(56) References Cited

U.S. PATENT DOCUMENTS

2015/0154862 A1   6/2015  Bespalov et al.
2016/0379489 A1*  12/2016 MacFarlane ......... G08G 1/0133
                                                      701/119
2018/0364725 A1*  12/2018 Lonari ................ B60W 30/188

FOREIGN PATENT DOCUMENTS

CN      103745106 A     4/2014
CN      107195177 A     9/2017
CN      107195177 A  *  9/2017  ............. G08G 1/012

OTHER PUBLICATIONS

Bai Tongxin, Based on Forecasting Methodology of the distributed memory Computational frame to city traffic road condition, 2017 (Year: 2017).*

(Continued)

*Primary Examiner* — James M McPherson
*Assistant Examiner* — Bakari Underwood
(74) *Attorney, Agent, or Firm* — ArentFox Schiff LLP

(57) ABSTRACT

Embodiments of this application provide a target road segment speed prediction method, apparatus, a server, and a non-transitory computer-readable medium. In the method, a first moving speed on a target road segment at a first time point is obtained. A plurality of second moving speeds on the target road segment at each of a plurality of time points before the first time point is obtained. A mean historical speed on the target road segment at the first time point during previous time cycles is obtained. A speed prediction feature of the target road segment at a second time point is determined. A moving speed on the target road segment at the second time point is predicted according to the speed prediction feature of the target road segment at the second time point and a pre-trained road segment speed prediction model.

20 Claims, 10 Drawing Sheets

(51) Int. Cl.
  *G06N 5/04*    (2006.01)
  *G01C 21/34*   (2006.01)

(56) References Cited

OTHER PUBLICATIONS

First Chinese Office Action Issued in Application CN201711014944.4 dated Sep. 30, 20121, with concise English Translation (14 pages).
International Search Report dated Dec. 28, 2018, in PCT/CN2018/109688 filed Oct. 10, 2018. (with English Translation).
Written Opinion International Search Report dated Dec. 28, 2018 in PCT/CN2018/109688 filed Oct. 10, 2018.

* cited by examiner

| 52 53 55 56 56 56 56 55 55 54 | 0.0166666667 | 48 48 49 50 50 50 50 49 49 51 | 50.95 52.45 52.85 |
|---|---|---|---|
| Road segment speed in each minute in 10 minutes before | Current moment | Historical road segment speed mean value of the target road segment before the minute in each minute in 10 minutes before | Road segment feature |

53.1578947368421 53.5 53.8 54.25 55.0 56.75 53.611169976 64677 1.199860668171932 1 505

Target speed clustering interval thereof 0.0000000000 5.0600000000 506

Time feature 49.68421052631579 50.31578947368421 50.526315789473685 50.78947368421053 51.1578947368421 51.578947368421055 51.78947368421053

Previous speed clustering interval 52.21052631578947 52.68421052631579 51.190430622009565 0.5916384698152513 54.25 55.15 55.4

Next speed clustering interval

56

Road segment speed in a current moment

FIG. 6

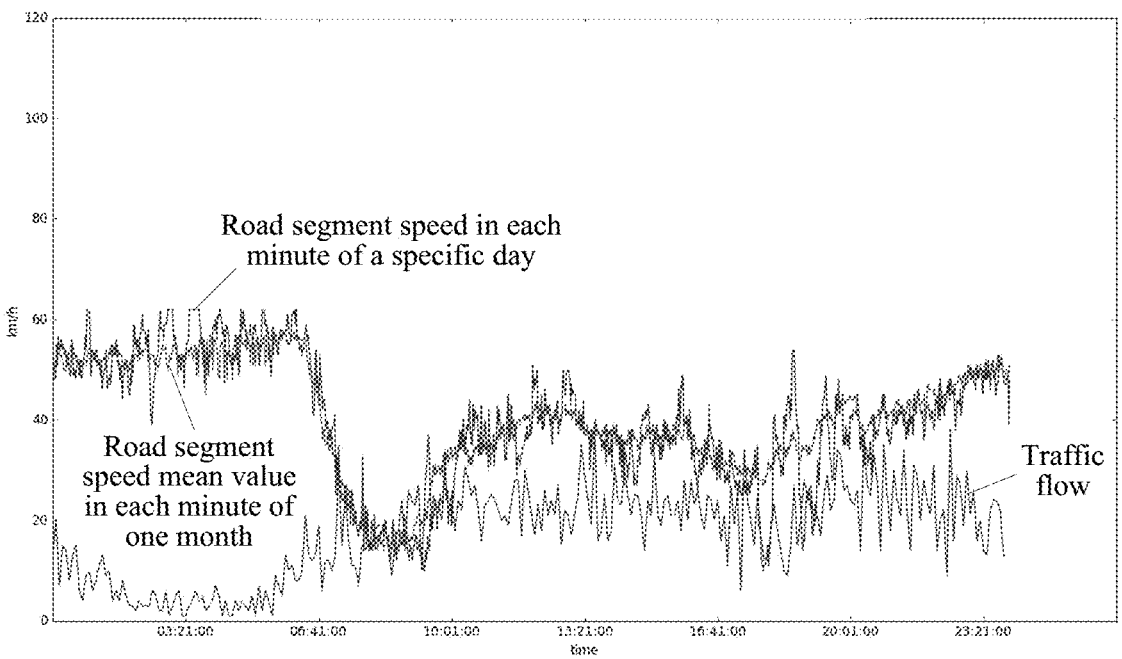

FIG. 7

ROAD SEGMENT SPEED PREDICTION METHOD, APPARATUS, SERVER, MEDIUM, AND PROGRAM PRODUCT

RELATED APPLICATION

This application is a continuation of International Application No. PCT/CN2018/109688, filed on Oct. 10, 2018, which claims priority to Chinese Patent Application No. 201711014944.4, entitled "ROAD SEGMENT SPEED PREDICTION METHOD, APPARATUS, SERVER, AND STORAGE MEDIUM," and filed on Oct. 25, 2017. The entire disclosures of the prior applications are hereby incorporated by reference in their entirety.

FIELD OF THE TECHNOLOGY

This application relates to the field of transportation.

BACKGROUND OF THE DISCLOSURE

A road segment speed of a road segment is a mean value of vehicle speeds of the road segment at a specific moment. The road segment speed is widely applied to scenarios, such as traffic condition-based route calculation in navigation. For example, a traffic condition of a road segment may be determined according to the road segment speed, to perform an accurate calculation for choosing an advantageous road segment in a navigation process. The advantageous road segment may be understood as a road segment that is relatively unobstructed in a road network.

To improve the result of a traffic condition-based route calculation, it is very important to predict a road segment speed of a specific road segment at a future moment. Therefore, how to improve accuracy of road segment speed prediction is a problem that a person skilled in the art needs to consider.

SUMMARY

In view of this, embodiments of this application provide a road segment speed prediction method, an apparatus, a server, and a non-transitory computer-readable medium, to improve the accuracy of road segment speed prediction.

According to an embodiment of the present disclosure, a method of predicting a moving speed of a target road segment is provided. In the method, a first moving speed on the target road segment at a first time point is obtained. A plurality of second moving speeds on the target road segment at each of a plurality of time points before the first time point is obtained. A mean historical speed on the target road segment at the first time point during previous time cycles is obtained. A speed prediction feature of the target road segment at a second time point is determined based on the first moving speed, the plurality of second moving speeds, and the mean historical speed on the target road segment at the first time point during the previous time cycles, the second time point being subsequent to the first time point. The moving speed on the target road segment at the second time point is predicted according to the speed prediction feature of the target road segment at the second time point and a pre-trained road segment speed prediction model.

In an embodiment, a speed prediction training feature of the target road segment is determined at each of a plurality of time points in a plurality of time cycles of a time range. A plurality of pieces of sample data is determined based on the determined speed prediction training features of the target road segment. Each of the plurality of pieces of sample data represents the speed prediction training feature of the target road segment at one of the plurality of time points in the plurality of the time cycles of the time range. The road segment speed prediction model is trained according to a machine learning algorithm and the plurality of pieces of sample data. The speed prediction training feature of the target road segment at the one of the plurality of time points during one of the plurality of time cycles includes a speed on the target road segment at the one of the plurality of time points, a speed on the target road segment at each of a subset of the plurality of time points before the one of the plurality of time points, and a mean historical speed on the target road segment at the one of the plurality of time points during the one of the plurality of time cycles.

In an embodiment, the speed prediction training feature of the target road segment at the one of the plurality of time points includes a speed clustering interval of the speed on the target road segment at the one of the plurality of time points, a previous speed clustering interval and a next speed clustering interval of the speed clustering interval, a time point at which the target road segment enters the speed clustering interval, a duration during which the target road segment is in the speed clustering interval, and a road segment feature of the target road segment.

In an embodiment, the speed prediction feature of the target road segment is determined at the second time point according to the first moving speed, the plurality of second moving speeds, the mean historical speed on the target road segment at the first time point during the previous time cycles, a target speed clustering interval of the speed on the target road segment at the first time point, a previous speed clustering interval and a next speed clustering interval of the target speed clustering interval, a time point at which the target road segment enters the target speed clustering interval, a duration during which the target road segment is in the target speed clustering interval, and a road segment feature of the target road segment.

In an embodiment, a mean historical speed on the target road segment for each of the plurality of time points is determined. The mean historical speed on the target road segment for each of the plurality of time points is clustered a plurality of times until a center of each speed clustering interval is the same as a center of a previous speed clustering interval.

In an embodiment, the mean historical speed on the target road segment at k time points are randomly selected as initial centers of k speed clustering intervals. For the mean historical speed for each of a plurality of remaining time points, at least one of the initial centers temporally connected to the respective remaining time point is determined, a dissimilarity between the mean historical speed at the respective remaining time point and the at least one of the initial centers is determined, and the mean historical speed at the respective remaining time point is clustered into the speed clustering interval corresponding to one of the at least one of the initial centers that has a lowest dissimilarity. The initial centers are adjusted based on the clustered mean historical speed at each of the plurality of remaining time points. The mean historical speed at each of the plurality of time points is re-clustered based on the adjusted initial centers. The mean historical speed at each of the plurality of time points is re-clustered by using a center of each speed clustering interval of previous clustering until a center of each re-clustered speed clustering interval is the same as the center of each speed clustering interval of the previous clustering.

In an embodiment, each of the speed clustering intervals includes a time period dimension and a road segment speed dimension. Further, the target speed clustering interval of the speed on the target road segment at the first time point is one of the speed clustering intervals which includes a time period dimension that matches the first time point.

In an embodiment, for one piece of the plurality of sample data, a road segment speed at a corresponding time point in the sample data predicted using the pre-trained road segment speed prediction model is compared with a real road segment speed at the corresponding time point in the sample data. The one piece of the plurality of sample data is determined as noise when a difference between the road segment speed at the corresponding time point in the sample data predicted using the pre-trained road segment speed prediction model and the real road segment speed at the corresponding time point in the sample data is greater than a threshold. Smoothing is performed on the noise by using a Kalman filter.

In an embodiment, the target road segment is determined according to a road segment identifier of the target road segment from a plurality of road segments presented on a map, and the predicted moving speed on the target road segment is associated at the second time point with the target road segment. A road segment weight of the target road segment is determined at the second time point by dividing a road segment length of the target road segment by the predicted moving speed on the target road segment at the second time point. The target road segment is determined as an advantageous road segment in a road network when the road segment weight of the target road segment at the second time point is greater than a threshold. The target road segment presented on the map is added to a traveling route.

Aspects of the disclosure also provide a server that performs any of the above methods.

Aspects of the disclosure also provide one or more non-transitory computer-readable storage mediums storing instructions which when executed by a computer cause the computer to perform any of the above methods.

In the road segment speed prediction method provided according to an embodiment of this application, factors affecting accuracy of road segment speed prediction are considered, when the road segment speed of the target road segment at the first moment is determined, the road segment speed at the second moment that is in the future and that has a predetermined time difference from the first moment is determined by using the road segment speed prediction model. The road segment speed prediction model is pre-trained by using a machine learning algorithm. The road segment speed may be predicted with the help of characteristics of high availability and high accuracy of the road segment speed prediction model trained by using the machine learning algorithm, so that controllability of an error of a road segment speed prediction result is improved, and accuracy of the road segment speed prediction result is improved.

BRIEF DESCRIPTION OF THE DRAWINGS

To describe the technical solutions of the embodiments of this application or the related technology more clearly, the following introduces the accompanying drawings required for describing the embodiments or the related technology. The accompanying drawings in the following description show only the embodiments of this application, and a person of ordinary skill in the art may still derive other drawings from the provided accompanying drawings.

FIG. 6 is an exemplary diagram of a road segment speed prediction feature according to an embodiment of this application.

FIG. 7 is a schematic diagram of a comparison between a road segment speed of a road segment in each minute of a specific day and a road segment speed mean value of the road segment speed in each minute of one month according to an embodiment of this application.

DESCRIPTION OF EMBODIMENTS

Related technologies for determining a road segment speed include computing a mean value of road segment speeds of a specific road segment at each historical moment and approximating a mean value of road segment speeds of the specific road segment at a specific historical moment as a road segment speed of the road segment at a future moment that is the same as the historical moment. For example, when predicting a road segment speed for the next minute (e.g., 10:10), one solution is to compute a mean value of historical road segment speeds of a road segment at 10:10, and approximating the mean value as a road segment speed of the road segment for the next minute (e.g., 10:10). However, a relatively large quantity of factors affect a road segment speed at a future moment, the above-described solution is merely approximating a mean value of historical road segment speeds of a specific road segment at a same moment as a road segment speed of the road segment at the same moment in the future. Consequently, a prediction result of the road segment speed has a relatively large error.

Therefore, the embodiments of this application provide methods of improving a road segment speed prediction method. Factors affecting accuracy of road segment speed prediction are obtained through research and analysis, a road segment speed prediction model is trained according to the factors, and road segment speed prediction with higher accuracy is achieved based on the trained road segment speed prediction model.

The following describes the technical solutions in the embodiments of this application with reference to the accompanying drawings in the embodiments of this application. The described embodiments are some embodiments of this application rather than all of the embodiments. All other embodiments obtained by a person of ordinary skill in the art based on the embodiments of this application fall within the protection scope of this application.

During prediction of a road segment speed of a road segment at a future moment, most major factors affecting the accuracy of road segment speed prediction include a road segment speed at a moment that is a predetermined time difference before a future moment, and a road segment speed at each set moment/time point and a historical road segment speed mean value before the moment.

In some examples, a future moment is a next minute, and factors affecting accuracy of road segment speed prediction of the next minute include a road segment speed at a current moment, a road segment speed in each minute in 10 minutes before the current moment, and a historical road segment speed mean value.

According to the embodiments of this application, the road segment speed prediction model may be trained by using at least the foregoing factors, and road segment speed prediction with higher accuracy is achieved based on the trained road segment speed prediction model.

Figure 1:
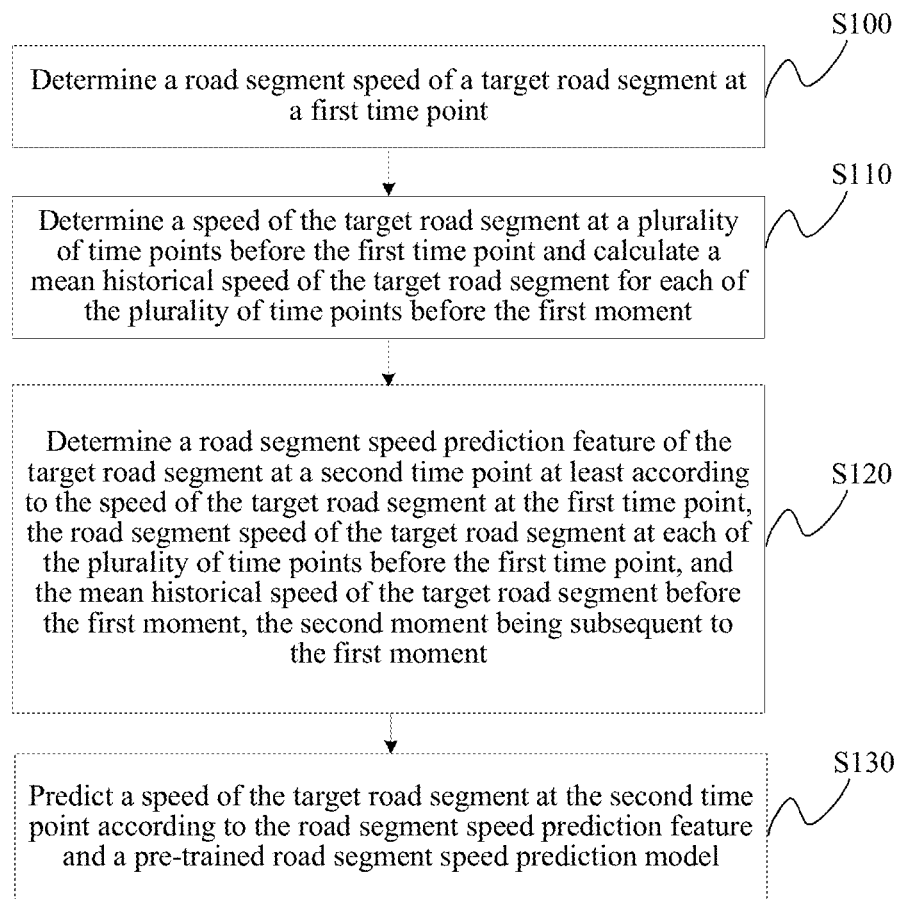
FIG. 1 is a flowchart of a road segment speed prediction method according to an embodiment of this application.

FIG. 1 is a flowchart of a road segment speed prediction method according to an embodiment of this application. The road segment speed prediction method may be applied to a server. The server may be a navigation server having a traffic condition-based route calculation function or may be a serving device that is configured to implement road segment speed prediction individually and that can interact with a navigation server. Referring to FIG. 1, the road segment speed prediction method provided according to an embodiment of this application may include:

At step S100, a road segment moving speed on a target road segment is determined/obtained at a first moment/time point.

The target road segment may be considered as a road segment on which road segment speed prediction currently needs to be performed. The target road segment may be any road segment in a road network. In an embodiment of this application, road segment speed prediction may be performed on any specified road segment in a road network. In some examples, a road segment may be understood as a transportation route between two nodes in the road network, and the two nodes in the road network may be set according to an actual situation. In an embodiment, one minute may be used as a unit of a moment, and a first moment may be a moment of a specific minute. For example, the first moment may be a current minute. In other embodiments of this application, two minutes, three minutes, or the like may alternatively be used as a unit of the moment. Specific selection of the unit of the moment may be set according to an actual situation.

In an embodiment, the first moment may be a moment that has arrived, for example, a current moment. A mean value of or average vehicle speeds of a target road segment at the first moment may be computed to determine a road segment speed of the target road segment at the first moment.

In an embodiment, the first moment may be a future moment, which is a moment that has not arrived. The road segment speed of the target road segment at the first moment may be predicted by using the road segment speed prediction method provided by the embodiments of this application. After predicting the road segment speed of the target road segment at the first moment, the predicted road segment speed of the target road segment at the first moment can be used to predict a road segment speed of the target road segment at a future moment posterior to the first moment.

At step S110, a plurality of road segment moving speeds on the target road segment at each set moment before the first moment and a historical road segment speed mean value on the target road segment before the first moment are determined/obtained.

In an embodiment, each set moment before the first moment may be each moment within a set time range before the first moment. In some examples, when a set time range is 10 minutes, each set moment before the first moment may be each minute within 10 minutes before the first moment (i.e., a $10^{th}$ minute to $1^{st}$ minute before the first moment). Correspondingly, a road segment speed of the target road segment in each minute within 10 minutes before the first moment and a historical road segment speed mean value of the target road segment before the first moment may be determined.

In an embodiment, a road segment speed of the target road segment at a specific moment before the first moment may be determined by computing a vehicle speed mean value at the moment before the first moment. For example, a road segment speed of the target road segment in the $10^{th}$ minute before the first moment may be determined by computing a vehicle speed mean value in the $10^{th}$ minute before the first moment. However, when a specific moment before the first moment has not arrived, a road segment speed of the target road segment at the moment before the first moment may be predicted by using the road segment speed prediction method provided by the embodiments of this application.

In an embodiment, a historical road segment speed mean value of the target road segment at a specific moment before the first moment may be determined by using a mean value of historical road segment speeds of the target road segment at the moment in a set time limit/range. The set time limit may include at least one time cycle, and the one time cycle may include a plurality of moments.

For example, the set time limit may be one month and the time cycle may be one day. Therefore, a historical road segment speed mean value of the target road segment at a specific moment before the first moment may be obtained by collecting a historical road segment speed of the target road segment at the moment each day in one month and computing a mean value of the collected historical road segment speeds of the target road segment.

At step S120, a road segment speed prediction feature of the target road segment at a second moment/time point is determined at least according to the road segment moving speed of the target road segment at the first moment, the plurality of road segment moving speeds on the target road segment in each set time point before the first moment, and the historical road segment speed mean value of the target road segment before the first moment. The second moment may be a future moment posterior to the first moment and having a predetermined time difference from the first moment.

When predicting a road segment speed at the second moment, factors affecting the accuracy of a road segment speed prediction result of the second moment may at least include: the road segment speed of the target road segment at the first moment, the road segment speed of the target road segment at each set moment/time point before the first moment, and the historical road segment speed mean value of the target road segment before the first moment. In an embodiment of this application, a road segment speed prediction feature may be determined by using at least the factors, which are input into a pre-trained road segment speed prediction model to predict a road segment speed at the second moment in the future.

In an embodiment, the second moment may be considered as a future moment that has not arrived and that is posterior to the first moment, and a time difference between the second moment and the first moment is a predetermined time difference. In an example, the predetermined time difference is one minute and the second moment may be a next minute of the first moment.

In an embodiment, when a current moment is used as the first moment, the second moment may be, for example, a next minute of the current moment. The second moment may alternatively be the next two minutes of the current moment or the like, may be specifically set according to an actual situation, and may be achieved by adjusting a training feature used during subsequent training of a road segment speed prediction model.

In an embodiment of this application, the road segment speed of the target road segment at the second moment in the future may be obtained by predicting the road segment speed prediction feature of the target road segment at the second moment. Moreover, the road segment speed prediction feature of the target road segment at the second moment may be determined at least according to the road segment speed of the target road segment at the first moment, the road segment speed of the target road segment at each set time point before the first moment, and the historical road segment speed mean value of the target road segment before the first moment. In addition, the first moment is prior to the second moment.

In an embodiment, when the first moment is a current moment, and each set time point before the first moment is each minute in 10 minutes before the current moment, the road segment speed prediction feature of the target road segment at the second moment in the future may at least include the contents in Table 1 below. The contents of Table 1 may be considered as an example of major factors affecting impact accuracy of road segment speed prediction.

In an embodiment, the contents in Table 1 may be referred to as a speed feature. The speed feature may be the most important factor affecting accuracy of road segment speed prediction.

In an embodiment, the road segment speed prediction feature of the target road segment at the second moment in the future described above is an example. Another dimension/factor may be added to the road segment speed prediction feature. For example, a road segment feature of the target road segment may be added to the road segment speed prediction feature, and the road segment feature of the target road segment may include: a road segment length, a road segment level (e.g., a high speed road, an urban expressway, a provincial road, a county road, a village road, and a small road), a road segment speed limit, and the like of the target road segment.

Table 1 describes that the first moment is a current moment, but does not exclude a situation that the first moment is a moment that is in the future and that is prior to the second moment.

At step S130, a road segment moving speed of the target road segment at the second moment is predicted according to the road segment speed prediction feature and a pre-trained road segment speed prediction model.

In an embodiment, the road segment speed prediction feature may be used as an input of the pre-trained road segment speed prediction model, and the pre-trained road segment speed prediction model predicts the road segment speed of the target road segment at the second moment.

In an embodiment of this application, pre-training may be performed based on a machine learning algorithm to obtain a road segment speed prediction model. The road segment speed prediction model may be used to predict, when one moment is specified, a road segment speed of the target road segment at a later moment having a predetermined time difference from the moment. For example, after the moment is specified, a road segment speed in a next minute of the moment may be predicted using the road segment speed prediction model.

In an embodiment, during training of the road segment speed prediction model, a road segment speed prediction model may be obtained based on the foregoing factors affecting accuracy of a road segment speed prediction result. Specifically, a road segment speed prediction model may be obtained by training using a machine learning algorithm according to at least the road segment speed prediction training feature of the target road segment at each time point in a set time limit. In addition, a road segment speed prediction training feature of the target road segment at one moment in a set time limit may be determined according to at least a road segment speed of the target road segment at

TABLE 1

| Current road segment speeds | Road segment speed in 10 minutes before the current moment | | | Historical road segment speed mean value in 10 minutes before the current moment | | | |
|---|---|---|---|---|---|---|---|
| Road segment speeds at a current moment | Road segment speed in a 10$^{th}$ minute before | Road segment speed in a 9$^{th}$ minute before | ... | Road segment speed in a 1$^{st}$ minute before | Historical road segment speed mean value in a 10$^{th}$ minute before | Historical road segment speed mean value in a 9$^{th}$ minute before | ... | Historical road segment speed mean value in a 1$^{st}$ minute before | the moment, a road segment speed of the target road segment at each set moment before the moment, and a historical road segment speed mean value of the target road segment before the moment.

In an embodiment, the road segment speed prediction model may be obtained by training by using a Gradient Boosting Decision Tree (GBDT) machine learning algorithm. Correspondingly, a model form of the road segment speed prediction model may be a GBDT model. It is to be noted that the GBDT is a machine learning algorithm for regression, the algorithm includes a plurality of decision trees, and conclusions of all the trees are accumulated as a final result. After a target function is converted, the algorithm may alternatively be used for classification or sorting. In some examples, the GBDT model may be used as a model form of the road segment speed prediction model, and a relatively good effect may be produced in resolving various regression problems with the help of a prediction capability of the GBDT model. In addition, a GBDT technology-based extreme gradient boosting library (e.g., xgBoost, which is a c++ implementation of gradient boosting, and has characteristics of a high speed and a good fitting effect) can ensure and boost a model training effect, which is helpful in subsequent engineerization. The GBDT has a strong generalization capability, and after the model is obtained by training, time costs of feature calculation to obtain a resultant value are relatively low because the feature calculation involves only simple comparison and accumulation operations.

In the road segment speed prediction method provided in an embodiment of this application, a road segment speed prediction model may be obtained by training using a machine learning algorithm according to a road segment speed prediction training feature of the target road segment at each time point in a set time limit, and the road segment speed prediction training feature of the target road segment at a moment in a set time limit may be determined according to at least a road segment speed of the target road segment at the moment, a road segment speed of the target road segment at each set time point before the moment, and a historical road segment speed mean value of the target road segment before the moment. Therefore, when a road segment speed of the target road segment at a second moment, which is in the future and has a predetermined time difference from the first moment, needs to be predicted, a road segment speed of the target road segment at the first moment, a road segment speed of the target road segment at each set time point before the first moment, and a historical road segment speed mean value of the target road segment before the first moment may be determined, to determine a corresponding road segment speed prediction feature of the target road segment at the second moment. Further, the road segment speed of the target road segment at the second moment is predicted according to the road segment speed prediction feature and the pre-trained road segment speed prediction model, so that when a target road segment of the road segment speed at a specific moment is determined, a road segment speed of the target road segment at a future moment having a predetermined time difference from the moment is predicted.

In an embodiment, factors affecting accuracy of road segment speed prediction are considered, when the road segment speed of the target road segment at the first moment is determined, the road segment speed at the second moment that is in the future and that has a predetermined time difference from the first moment is determined by using the road segment speed prediction model pre-trained by using the machine learning algorithm, and accurate prediction of the road segment speed may be predicted with the help of characteristics of high availability and high accuracy of the road segment speed prediction model trained by using the machine learning algorithm, so that controllability of an error of a road segment speed prediction result is improved, and accuracy of the road segment speed prediction result is improved.

Figure 2:
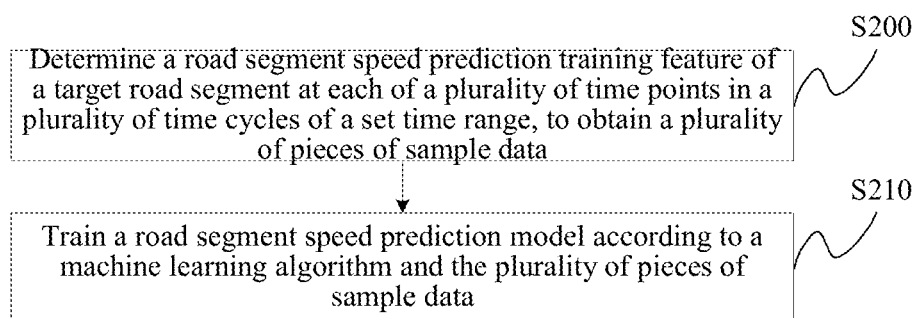
FIG. 2 is a flowchart of training of a road segment speed prediction model according to an embodiment of this application.

In an embodiment, a process of obtaining a road segment speed prediction model by pre-training is described below, and FIG. 2 shows an exemplary training procedure of a road segment speed prediction model.

At step S200, a road segment speed prediction training feature of the target road segment is determined at each time point of each time cycle of a set time limit to obtain a plurality of pieces of sample data.

In an embodiment, one piece of sample data may represent a road segment speed prediction training feature of the target road segment at one moment of one time cycle of the set time limit. The road segment speed prediction training feature of the target road segment at one moment of one time cycle of the set time limit may at least include: a road segment speed of the target road segment at the one moment of the one time cycle of the set time limit and a road segment speed of the target road segment at each set time point before the one moment and historical road segment speed mean value of the target road segment before the one moment.

In an embodiment, the set time limit may include at least one time cycle, and the one time cycle may include a plurality of moments.

In an embodiment, the set time limit may be a time limit such as one month or half a year, one day may be one time cycle, and each minute in one day may be understood as each set time point in one time cycle.

In an embodiment, the set time limit may be one month, the time cycle may be one day, and the set time point may be a minute. Correspondingly, one piece of sample data may represent a road segment speed prediction training feature of the target road segment in a specific minute of a specific day of a specific month, so that for the target road segment, a road segment speed prediction training feature of each minute of each day in one month may be collected to obtain a plurality of pieces of sample data.

Specific forms of the set time limit, the time cycle, and the moment may alternatively be set according to an actual situation.

In an embodiment, the time cycle may be a date of a set weekday type (when the set weekday type is Monday, each Monday is used as a time cycle, a road segment speed prediction training feature of each road segment at each time point on each Monday of a set time limit, and a road segment speed prediction model may be correspondingly obtained by training. Therefore, a road segment speed at a moment on Monday may be predicted. Alternatively, the set weekday type may include that: Monday is a weekday type, Tuesday to Thursday are a weekday type, Friday is a weekday type, and Saturday to Sunday are a weekday type. Correspondingly, a road segment speed prediction training feature of each road segment at each time point may be collected, for example, on each Tuesday to Thursday in a set time limit, and a road segment speed prediction model is obtained by training. Therefore, a road segment speed at a moment on Tuesday to Thursday can be predicted. In another example, a road segment speed prediction training feature of each road segment at each time point may be collected on each Friday in a set time limit, and a road segment speed prediction model is obtained by training. Therefore, a road segment speed at a moment on Friday can be predicted. In another example, a road segment speed prediction training feature of each road segment at each time point may be collected on each Saturday to Sunday in a set time limit, and a road segment speed prediction model is obtained by training. Therefore, a road segment speed at a moment on Saturday to Sunday can be predicted.

At step S210, the road segment speed prediction model is determined by training according to a machine learning algorithm and the plurality of pieces of sample data.

In an embodiment, the GBDT machine learning algorithm may be selected as the machine learning algorithm. Correspondingly, the road segment speed prediction model obtained by training may be a road segment speed prediction model in a GBDT model form.

In an embodiment, in a process of training a road segment speed prediction model, selection of a speed prediction training feature is particularly crucial, and the exemplary speed prediction training features are described below.

Using a road segment speed prediction training feature of a target road segment at a moment of one time cycle of a set time limit as an example, in a first implementation, the road segment speed prediction training features at the moment may at least include:

a road segment speed of the target road segment at the moment; and a road segment speed of the target road segment at each set time point before the moment and a historical road segment speed mean value of the target road segment before the moment.

A difference between the speed prediction training features in Table 1 and the above-described exemplary speed prediction training features is that during training of the road segment speed prediction model, a corresponding content of Table 1 needs to be determined for each time point of each time cycle of a set time limit.

In a second implementation, when a road segment speed of a road segment at a future moment is predicted, in addition to the road segment speed at a moment that is a predetermined time difference before the future moment and a road segment speed at each set time point and the historical road segment speed mean value before the moment, the factors affecting accuracy of road segment speed prediction may further include: a road segment feature of the target road segment, a previous speed clustering interval/range and a next speed clustering interval of a speed clustering interval of the road segment speed of the target road segment at one moment of one time cycle, a time of the one moment, a time at which the target road segment enters the speed clustering interval of the road segment speed, and a duration during which the target road segment is in the speed clustering interval of the road segment speed.

Therefore, based on the above-described factors, the road segment speed prediction training features of the target road segment at one moment of one time cycle of the set time limit may include:

a road segment speed of the target road segment at the moment;

a road segment speed of the target road segment at each set time point before the moment and a historical road segment speed mean value of the target road segment before the moment;

a road segment feature of the target road segment, the road segment feature including a road segment length, a road segment level e.g., a high speed road, an urban expressway, a provincial road, a county road, a village road, and a small road), a road segment speed limit, and the like;

a speed clustering interval of the road segment speed of the target road segment at the moment in a plurality of pre-divided speed clustering intervals, and a previous speed clustering interval and a next speed clustering interval of the speed clustering interval; and a time of the moment, a time at which the target road segment enters the speed clustering interval of the road segment speed, and a duration during which the target road segment is in the speed clustering interval of the road segment speed.

In an example, when each set time point before a specific moment is each minute in 10 minutes before the moment, the road segment speed prediction training feature of the target road segment at one moment of one time cycle of the set time limit may include the contents in Table 2 below. The contents of Table 2 may be considered as another example of factors affecting impact accuracy of road segment speed prediction.

TABLE 2

| Road segment speed of the moment | Road segment speeds at one moment of one time cycle of a set time limit |
| --- | --- |
| Road segment speed in a $10^{th}$ minute before | Road segment speeds in 10 minutes before the moment |
| Road segment speed in a $9^{th}$ minute before | |
| . . . | |
| Road segment speed in a $1^{st}$ minute before | |
| Historical road segment speed mean value in a $10^{th}$ minute before | Historical road segment speed mean values in 10 minutes before the moment |
| Historical road segment speed mean value in a $9^{th}$ minute before | |
| . . . | |
| Historical road segment speed mean value in a $1^{st}$ minute before | |
| Time of the moment | Time features |
| Time of entering a target speed clustering interval | |
| Duration of being in a target speed clustering interval | |
| Previous speed clustering interval | Clustering features |
| Target speed clustering interval of the moment | |
| Next speed clustering interval | |
| Length of the road segment | Road features |
| Road segment level | |
| Road segment speed limit | |

In an embodiment, in the contents of Table 2, the contents related to the road segment speed at one moment of one time cycle of a set time limit, the road segment speed in 10 minutes before the moment, and the historical road segment speed mean value in 10 minutes before the moment are related to the speed features.

In an embodiment, a plurality of speed clustering intervals may be pre-divided, and a speed clustering interval includes historical road segment speed mean values of a target road segment at a plurality of moments that are close to each other in terms of value. In addition, a speed clustering interval includes a time period dimension and a road segment speed dimension. Therefore, when determining a target speed clustering interval of a road segment speed of the target road segment at a specific moment, a speed clustering interval having a time period dimension matching the specific moment may be determined as the speed clustering interval of the road segment speed of the target road segment at the moment.

In an embodiment, when the speed clustering intervals are divided, a historical road segment speed mean value of the target road segment at each moment may be determined. The historical road segment speed mean value of the target road segment at each moment is clustered a plurality of times until a center (e.g., an average or mean speed) of each speed clustering interval is the same as a center of each speed clustering interval of a previous cluster, to obtain k speed clustering intervals. In some examples, k may be a set value.

Figure 3:
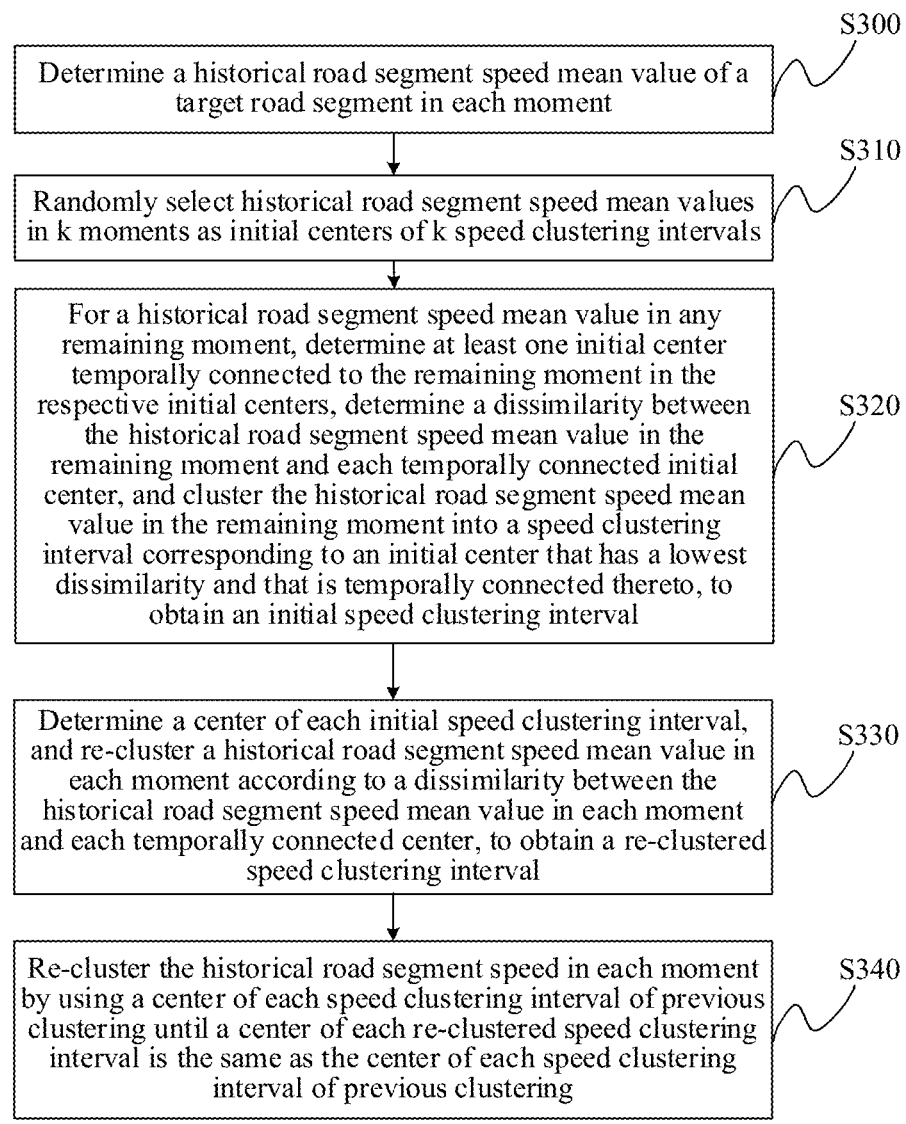
FIG. 3 is a flowchart of division of speed clustering intervals according to an embodiment of this application.

FIG. 3 shows a flowchart of an exemplary division of speed clustering intervals.

At step S300, a historical road segment speed mean value of a target road segment is determined at each moment.

In an embodiment, the historical road segment speed mean value of the target road segment at one moment may be determined using a mean value of historical road segment speeds of the target road segment at the moment in respective time cycles in a set time limit. For example, in a set time limit, historical road segment speeds of the target road segment at the moment in respective time cycles may be determined, and then, the historical road segment speeds of the target road segment at the moment in respective time cycles are averaged to obtain a historical road segment speed mean value of the road segment at the moment.

For example, for a historical road segment speed mean value of the target road segment at a specific time (e.g., 10:10), historical road segment speeds of the target road segment at the specific time in each day of one month may be obtained, and the historical road segment speeds of the target road segment are averaged to obtain a historical road segment speed mean value of the road segment in the minute.

At step S310, historical road segment speed mean values at k moments are randomly selected as initial centers of k speed clustering intervals.

In an embodiment, k is a set value and may be set according to an actual situation. After the set value k is determined, the k moments may be randomly selected from all moments. Further, the historical road segment speed mean values of the k moments can be used as initial centers of the k speed clustering intervals, so that each initial center may have a corresponding time and a corresponding historical road segment speed mean value.

In an embodiment, the selected k moments may be k evenly distributed moments. For example, adjacent moments in the k moments have a same time interval.

At step S320, for a historical road segment speed mean value at a remaining moment/time point, determine at least one of the initial centers temporally connected to the remaining moment. A dissimilarity is determined between the historical road segment speed mean value at the remaining moment and each temporally connected initial center, and the historical road segment speed mean value at the remaining moment is clustered into a speed clustering interval corresponding to a temporally connected initial center that has a lowest dissimilarity, so that an initial speed clustering interval is obtained.

In an embodiment, for a historical road segment speed mean value at a remaining moment, at least one of the initial centers temporally connected to the remaining moment may be determined. Each initial center of the pre-divided k speed clustering intervals has a road segment speed and a time, and for a historical road segment speed mean value at a remaining moment, an initial center temporally connected to the remaining moment may be determined. The temporally connected initial center may be temporally prior to the remaining moment or may be posterior to the remaining moment, so that dissimilarity calculation is performed on the historical road segment speed mean value of the remaining moment and each temporally connected initial center, to cluster the historical road segment speed mean value of the remaining moment to a speed clustering interval corresponding to a temporally connected initial center that has a lowest dissimilarity.

Therefore, such processing is performed on a historical road segment speed mean value at each remaining moment, so that an initial speed clustering interval after historical road segment speed mean values at all moments are clustered may be determined.

In an embodiment, the k initial centers include: 9:10, 10:10, and 11:10, and for a time point of 9:50, 9:10 and 10:10 in the k initial centers may be temporally connected to the time point of 9:50. Because there is 10:10 before 11:10, 11:10 may not be considered to be temporally connected to the time point of 9:50.

In an embodiment, the remaining moment may be a moment that remains in one time cycle after k moments/initial centers are removed. For example, a time cycle is one day, k moments are 10:10 and 11:10, and the remaining moments may be moments of remaining integer minutes at moments of all integer minutes in one day after 10:10 and 11:10 are removed.

At step S330, a center of each initial speed clustering interval is determined, and a historical road segment speed mean value at each moment is re-clustered according to a dissimilarity between the historical road segment speed mean value at each moment and each determined center, to obtain a re-clustered speed clustering interval.

Specifically, after the initial speed clustering interval is obtained, a center of each initial speed clustering interval may be determined according to historical road segment speed mean values clustered by each initial speed clustering interval. Therefore, for a historical road segment speed mean value at any moment, a dissimilarity between the historical road segment speed mean value at the moment and a center of each temporally connected initial speed clustering interval is determined, and the historical road segment speed mean value of the moment is clustered into a speed clustering interval corresponding to a center that has a lowest dissimilarity and that is temporally connected thereto. Processing is performed on a historical road segment speed mean value at each moment in this way, so that the historical road segment speed mean value at each moment may be re-clustered, to obtain a re-clustered speed clustering interval.

At step S340, the historical road segment speed at each moment is re-clustered by using a center of each speed clustering interval of previous clustering until a center of each re-clustered speed clustering interval is the same as the center of each speed clustering interval of a previous clustering.

In an embodiment, after a speed clustering result of re-clustering is obtained, a historical road segment speed mean value at each moment may be re-clustered again by using a speed clustering result of previous re-clustering. In some examples, a clustering policy/process may be unchanged, that is, a historical road segment speed mean value at a moment is clustered to a speed clustering result corresponding to a center that has a lowest dissimilarity and that is temporally connected thereto, which is cycled/repeated until a center of each speed clustering interval after re-clustering is the same as a center of a speed clustering interval of previous clustering.

After k speed clustering intervals are divided, each speed clustering interval may include two dimensions, namely, a time period dimension and a road segment speed dimension, so that for a road segment speed target road segment at a specific moment, a speed clustering interval whose time period dimension matches the moment may be determined, to obtain a speed clustering interval of a road segment speed of a target road segment at the moment.

Moreover, k speed clustering intervals may be ranked according to a time sequence of the k speed clustering intervals, so as to determine the previous speed clustering interval and a next speed clustering interval of the target speed clustering interval.

Further, for a specific moment, a time at which the target road segment enters the target speed clustering interval and a duration during which the target road segment is in the target speed clustering interval before the time may be determined. For example, a speed clustering interval of the target road segment is determined moment by moment before the moment, a time range of continuously entering the target speed clustering interval at the moment is determined, a starting time of the time the range is used as a time at which the target road segment enters the target speed clustering interval before the moment, and a duration of the time range is used as a time during which the target road segment is in the target speed clustering interval before the moment.

Figure 4:
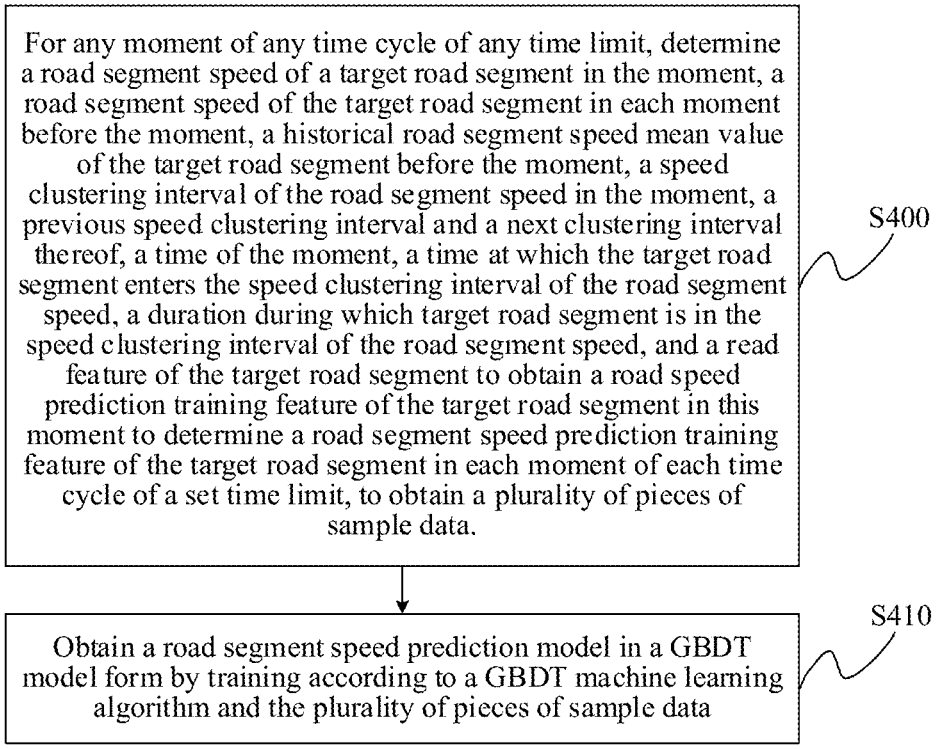
FIG. 4 is a flowchart of training a road segment speed prediction model according to an embodiment of this application.

FIG. 4 shows an exemplary training procedure of a road segment speed prediction model.

At step S400, for a moment of a time cycle of a time limit, a road segment speed of a target road segment is determined at the moment, a road segment speed of the target road segment at each moment before the moment, a historical road segment speed mean value of the target road segment before the moment, a speed clustering interval of the road segment speed at the moment, a previous speed clustering interval and a next clustering interval thereof, a time of the moment, a time at which the target road segment enters the speed clustering interval of the road segment speed, a duration during which target road segment is in the speed clustering interval of the road segment speed, and a read feature of the target road segment to obtain a road speed prediction training feature of the target road segment at this moment to determine a road segment speed prediction training feature of the target road segment at each moment of each time cycle of a set time limit, to obtain a plurality of pieces of sample data.

At step S410, a road segment speed prediction model in a GBDT model form is determined by training according to a GBDT machine learning algorithm and the plurality of pieces of sample data.

It is to be noted that after the foregoing content used as the road segment speed prediction training feature is checked by using relevance, the speed feature in the road segment speed prediction training feature has a largest impact on accuracy of road segment speed prediction. That is, the speed feature is the most important factor affecting accuracy of road segment speed prediction. However, the time features, the clustering features, and the road features also greatly affect the accuracy of the road segment speed prediction. Therefore, comprehensively using the foregoing contents as the road segment speed prediction training feature may improve prediction accuracy of the road segment speed prediction model.

Figure 5:
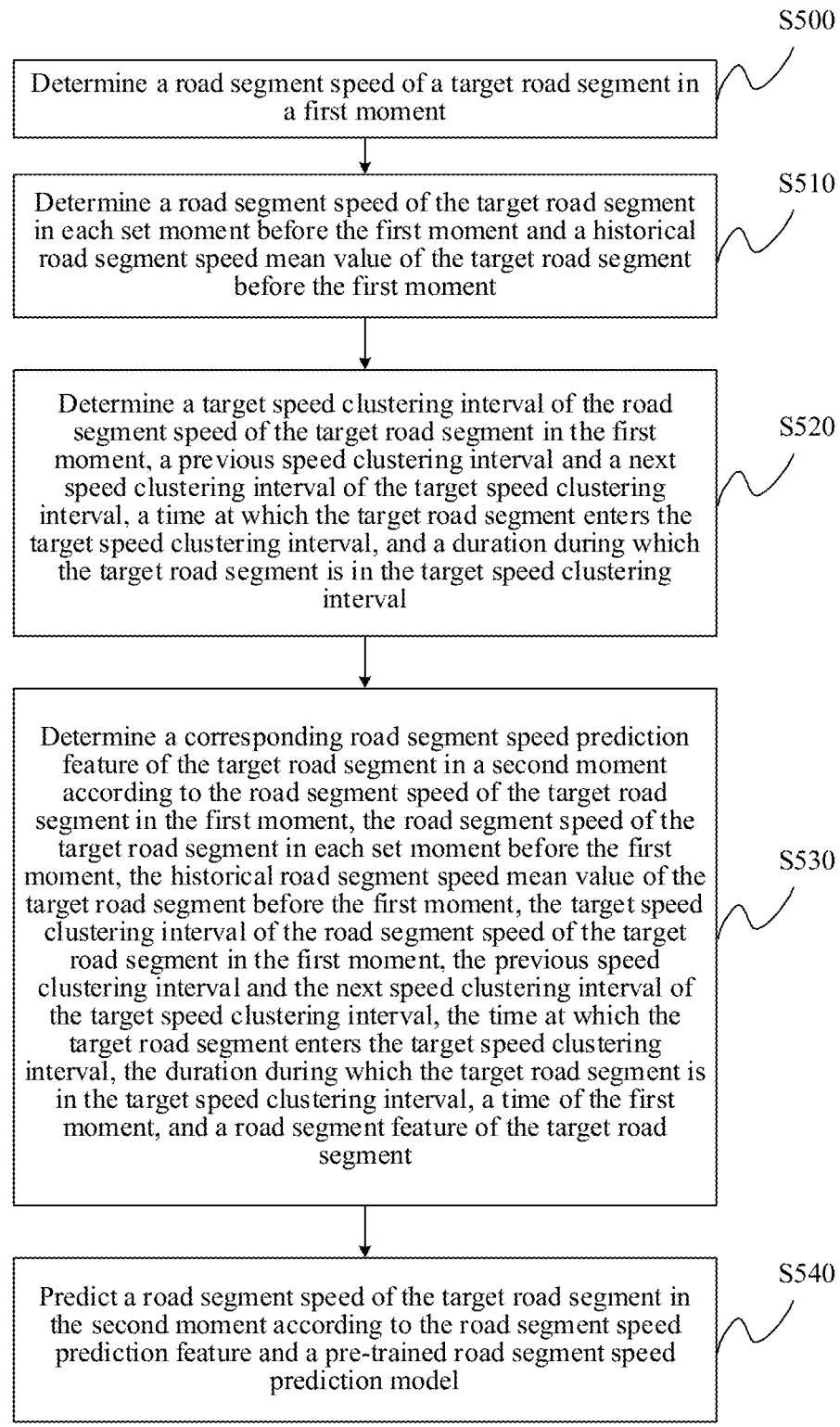
FIG. 5 is a flowchart of a road segment speed prediction method according to an embodiment of this application.

Based on the road segment speed prediction model trained by using the method shown in FIG. 4, a road segment speed prediction method provided in an embodiment of this application may be shown in FIG. 5.

At step S500, a speed of a target road segment is determined at a first moment.

At step S510, a road segment speed of the target road segment is determined at each set moment before the first moment and a historical road segment speed mean value of the target road segment before the first moment.

At step S520, a target speed clustering interval of the road segment speed of the target road segment at the first moment, a previous speed clustering interval and a next speed clustering interval of the target speed clustering interval, a time at which the target road segment enters the target speed clustering interval, and a duration during which the target road segment is in the target speed clustering interval are determined.

In an embodiment, the order of step S520 and step S510 can be switched.

At step S530, a road segment speed prediction feature of the target road segment at a second moment is determined according to the road segment speed of the target road segment at the first moment, the road segment speed of the target road segment at each set moment before the first moment, the historical road segment speed mean value of the target road segment before the first moment, the target speed clustering interval of the road segment speed of the target road segment at the first moment, the previous speed clustering interval and the next speed clustering interval of the target speed clustering interval, the time at which the target road segment enters the target speed clustering interval, the duration during which the target road segment is in the target speed clustering interval, a time of the first moment, and a road segment feature of the target road segment.

In an embodiment, as compared with a situation that the road segment speed prediction feature of the target road segment at the second moment includes the road segment speed of the target road segment at the first moment, the road segment speed of the target road segment at each set moment before the first moment, and the historical road segment speed mean value of the target road segment before the first moment, the road segment speed prediction feature of the target road segment at the second moment may further include: the target speed clustering interval of the road segment speed of the target road segment at the first moment, the previous speed clustering interval and the next speed clustering interval of the target speed clustering interval, the time at which the target road segment enters the target speed clustering interval, the duration during which the target road segment is in the target speed clustering interval, the time of the first moment, and the road segment feature of the target road segment.

At step S540, a road segment speed of the target road segment at the second moment is predicted according to the road segment speed prediction feature and a pre-trained road segment speed prediction model.

In an embodiment, when the first moment is a current moment, an example of determining a road segment speed prediction feature at a second moment in the future based on the first moment is shown in FIG. 6. An exemplary content of the road segment speed prediction feature shown in FIG. 6 may be described as follows.

52 53 55 56 56 56 56 55 55 54 0.0166666667 48 48 49 50 50 50 50 49 49 51 50.95 52.45 52.85 53.1578947368421 53.5 53.8 54.25 55.0 56.75 53.61116997664677 1.199860668171932 1 505 0.0000000000 5.0600000000 506 49.68421052631579 50.31578947368421 50.526315789473685 50.78947368421053 51.1578947368421 51.578947368421055 51.78947368421053 52.21052631578947 52.68421052631579 51.190430622009565 0.5916384698152513 54.25 55.15 55.4 56.

In an example, one month may be used as a sample data collection time limit, a road segment speed of the target road segment in each minute of each day in one month is connected, and a historical road segment speed mean value of the target road segment in each minute of one day is calculated. Meanwhile, a plurality of speed clustering intervals is divided according to the historical road segment speed mean value of the target road segment in each minute.

For each minute of each day in one month, a road segment speed prediction training feature of the target road segment is determined. The road segment speed prediction training feature of the target road segment in a specific minute of a specific day in one month may include: a road segment speed of the target road segment in the minute, a road segment speed of the target road segment in each minute in 10 minutes before the minute, a historical road segment speed mean value of the target road segment before the minute, a speed clustering interval of the road segment speed of the target road segment in the minute, a previous speed clustering interval and a next speed clustering interval, a specific time of the minute, a time at which the target road segment enters the speed clustering interval, and a duration during which the target road segment is in the speed clustering interval, and a road segment feature of the target road segment.

A road segment speed prediction training feature of the target road segment in a specific minute of a specific day in one month is used as one piece of sample data, so as to obtain a plurality of pieces of sample data.

A road segment speed prediction model in a GBDT model form is obtained by training according to a GBDT machine learning algorithm by using the plurality of pieces of sample data as a training input.

When a road segment speed of the target road segment in a next minute needs to be predicted in a current minute, a road segment speed prediction feature of the target road segment in the next minute of the current minute is determined, and the road segment speed prediction feature includes: a road segment speed of the target road segment in the current minute, a road segment speed of the target road segment in each minute in 10 minutes before the current minute, a historical road segment speed mean value of the target road segment before the current minute, a target speed clustering interval of the road segment speed of the target road segment in the current minute, a previous speed clustering interval and a next speed clustering interval of the target speed clustering interval, a specific time of the current minute, a time at which the target road segment enters the target speed clustering interval, and a duration during which the target road segment is in the target speed clustering interval, and a road segment feature of the target road segment.

The road segment speed prediction feature of the target road segment in the next minute of the current minute is used as an input of the road segment speed prediction model, to predict a road segment speed of the target road segment in the next minute of the current minute.

In an embodiment, when the road segment speed prediction model is trained, for the time cycle, each day does not need to be selected. Different time cycles have relatively large road segment speed changes and distribution differences. For example, a speed in a Monday morning is different from a speed in a Sunday morning, and a change from a speed after work on a Friday to a speed on a Saturday to a speed on a Sunday is also relatively large. Therefore, when the same processing is performed, a prediction result is greatly interfered with and affected. Therefore, in an embodiment of this application, time cycles of dates with different weekday types may be distinguished, and road segment speed prediction models of different weekday types are respectively trained by using sample data of time cycles of dates with different weekday types. For example, road segment speed prediction models corresponding to Monday, Tuesday to Thursday, Friday, and Saturday to Sunday are respectively trained. A road segment speed prediction model of a weekday type may correspondingly predict a road segment speed of the weekday type at a specific future moment. For example, a road segment speed prediction model of Monday may predict a road segment speed at the moment on Monday, a road segment speed prediction model of Tuesday to Thursday may predict a road segment speed at the moment on Tuesday to Thursday, and so on.

In an embodiment, in a process of training a road segment speed prediction model, to make a prediction result of the road segment speed prediction model more accurate, sample data may alternatively be optimized. Since a road network has huge data, there are situations such as road segment noise and a small quantity of samples, leading to a phenomenon that a road segment is not covered or a small quantity of road segments are covered. Consequently, a model obtained by training cannot resolve a problem of this type of road segments, and therefore, generate a problem of an excess prediction error. Therefore, in a possible implementation of this embodiment of this application, for one piece of sample data, a road segment speed at a corresponding moment in the sample data predicted by the road segment speed prediction model may be compared with a real road segment speed at the corresponding moment in the sample data, and when a difference after comparison is greater than a difference threshold, the sample data is determined to be a noise. Smoothing may be performed on the noise by using a Kalman filter, so that a road segment speed predicted by the road segment speed prediction model approximates a real road segment speed.

For example, based on sample data, after a road segment speed at a specific moment is predicted by the road segment speed prediction model, a real road segment speed in the moment in the sample data may be compared with the predicted road segment speed, and when a comparison difference is greater than a difference threshold, the sample data is determined to be a noise. Smoothing may be performed on the noise by using a Kalman filter, so that a road segment speed predicted by the road segment speed prediction model that is finally obtained by training approximates a real road segment speed.

The Kalman filter uses the minimum mean square error as an optimal criterion to seek for a recursive estimation algorithm. Simply speaking, within a range of sample data, when a difference between a predicted road segment speed and a real road segment speed in the sample data is greater than a difference threshold of dynamic adjustment, the Kalman filter is used to enable module calculation to make a final result approach the real road segment speed. It is likely that smoothing is performed because the noise causes an excess prediction error.

It is to be noted that a road segment speed of a road segment has specific regularity. For example, after a typical road segment (e.g., a high speed road, an urban expressway, a provincial road, a county road, a village road, and a small road) is selected, a road segment speed of the typical road segment in each minute on each Tuesday to Thursday of one month is captured, and a road segment speed mean value of the typical road segment in each minute of one month is obtained, the road segment speed mean value of the typical road segment in each minute of one month is compared with a road segment speed of the typical road segment in each minute of a specific day, as shown in FIG. 7. It may be found that the road segment speed of the typical road segment in each minute of the specific day approximates the obtained road segment speed mean value in each minute. In addition, in view of FIG. 7, a traffic flow and a road segment speed do not have an obvious relevant characteristic.

Figure 8:
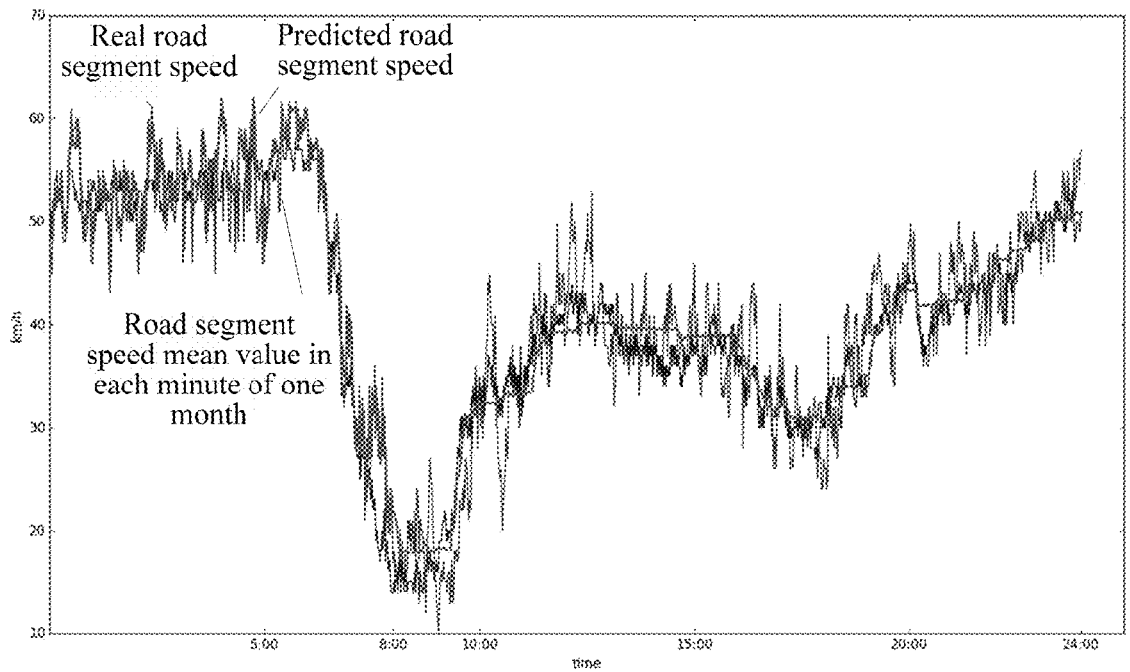
FIG. 8 is a schematic diagram of a comparison between a road segment speed in a specific minute predicted by a road segment speed prediction model and a real road segment speed in sample data according to an embodiment of this application.

In addition, after a road segment speed prediction model is trained by selecting a road segment speed training feature of the typical road segment in each minute of each day in one month as sample data, a road segment speed in a specific minute predicted by the road segment speed prediction model is compared with a real road segment speed in the minute in the sample data. FIG. 8 shows that the predicted speed can better fit a monthly mean speed of the typical road segment.

In an embodiment of this application, when the road segment speed of the target road segment at the first moment is determined, the road segment speed at the second moment that is in the future and that has a predetermined time difference from the first moment is determined by using the road segment speed prediction model. The road segment speed prediction model may be pre-trained by using the machine learning algorithm, and accurate prediction of the road segment speed may be predicted with the help of characteristics of high availability and high accuracy of the road segment speed prediction model trained by using the machine learning algorithm, so that controllability of an error of a road segment speed prediction result is improved, and accuracy of the road segment speed prediction result is improved.

In an embodiment, based on the road segment speed prediction methods described above, after a road segment speed of the target road segment at a second moment that is in the feature is predicted, the predicted road segment speed of the target road segment at the second moment that is in the feature is associated with the target road segment presented on a map, so as to present the road segment speed of the target road segment at the second moment that is in the feature while presenting the target road segment on the map.

Specifically, each road segment presented on a map may have a road segment identifier, and one road segment presented on the map corresponds to one unique road segment identifier, so that a target road segment may be determined according to a road segment identifier of the target road segment from a plurality of road segments presented on the map, and the predicted road segment speed of the target road segment at the second moment that is in the future is associated with the target road segment presented on the map, so that when the target road segment is presented on the map, the road segment speed of the target road segment at the second moment that is in the feature may be presented.

In an embodiment, the road segment speed of the target road segment at a future moment presented on the map may be updated minute by minute. For example, for the target road segment, when a current minute arrives, a road segment speed of the target road segment in a next minute may be predicted by using the road segment speed prediction method provided in the embodiments of this application, so as to update the road segment speed of the target road segment at a future moment presented on the map minute by minute.

In an embodiment, a road segment weight of the target road segment at the second moment that is in the future may be further calculated by using the predicted road segment speed of the target road segment at the second moment. The road segment weight may be used to estimate traffic condition costs reflecting a traffic condition, so as to select an advantageous road segment from a road network, to provide a service for traffic condition-based route calculation of navigation.

It is to be noted that currently a road segment weight can be calculated by using a real-time road segment speed, but a road segment speed changes with time. When a road segment speed at this moment is used for route planning, after a user travels for a period of time and approaches an end road segment, a speed of the road segment has changed, and in this case, both a traffic condition and a road segment speed deviate from the situations at a starting point. In this case, still using an initial value as a road segment speed for route calculation may not be accurate.

Figure 9:
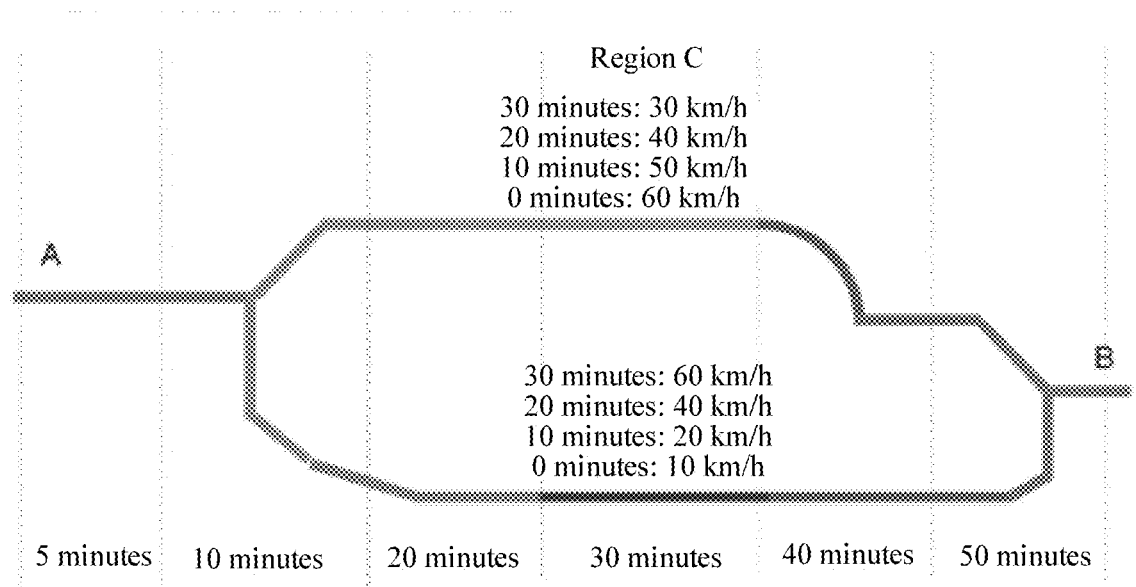
FIG. 9 is an exemplary diagram of a road segment speed changing with time according to an embodiment of this application.

As shown in FIG. 9, a starting point is A, a point B is an end point, a region C is passed through, and at a current moment, a road segment speed of an upper part of the region C is 60 km/h, and a road segment speed of a lower part of the region C is 10 km/h. After 30 minutes, when a vehicle enters the region C, the road segment speed of the lower part has been increased to 60 km/h, the road segment speed of the upper part has been decreased to 30 km/h. Therefore, it appears that there is traffic congestion in the upper part of the region C. During the route calculation, it is improper to use a real-time road segment speed, and using a predicted future road segment speed is more proper.

After the road segment speed of the target road segment at the second moment that is in the future is predicted, a road segment length of the target road segment may be divided by the predicted road segment speed, to obtain a road segment weight of the target road segment at the second moment in the future. In an embodiment of this application, a road segment length corresponding to a road segment identifier of each road segment may be recorded, so that a road segment length of the target road segment may be determined according to a road segment identifier of the target road segment.

In an embodiment, the calculated weight may be fine-tuned through some adjustment policies (e.g., a path weight, main and side road weights, and turning costs). In addition, for improving the accuracy of a weight and efficiency of a route calculation service, offline static weight processing may be performed. The fine-tuned road segment weighted may be cached in redis, and is read and updated by a navigation server minute by minute.

At present, road segment weights are stored in A-star (i.e., a route calculation method) by using a static array, and only data in a current one minute is stored. After a predicted road segment speed is added, during route calculation, it is likely that a weight corresponding to a road segment speed in the future needs to be used, so that a road segment weight in the future needs to be stored. In comprehensive consideration of storage and efficiency of a server and a relatively large quantity of short route navigation scenarios for users of mobile phone maps, a solution of caching weights of 60 minutes in the future to perform update minute by minute may be used.

In an embodiment, after a road segment weight of the target road segment at the second moment that is in the future is determined, route calculation may be implemented, to determine a road segment that needs to be added to a traveling route planned on a map. Specifically, whether the target road segment is an advantageous road segment in a road network may be determined according to a road segment weight of the target road segment at the second moment. The feature of the target road segment may include the road segment weight of the target road segment. When the target road segment is an advantageous road segment in a road network, the target road segment presented on a map is determined according to a road segment identifier of the target road segment, and the target road segment presented on the map is added to a traveling route planned on the map, to implement selection of a road segment added to a route during a route calculation process.

In an embodiment, determining whether the target road segment is an advantageous road segment in a road network according to the road segment weight of the target road segment at the second moment that is in the future may further comprise: determining whether the road segment weight of the target road segment at the second moment is greater than a preset weight threshold, and determining the target road segment is the advantageous road segment in the road network when the road segment weight of the target road segment at the second moment is greater than the preset weight threshold.

In an embodiment, the foregoing route calculation implementation process may be updated minute by minute. For example, the road segment weight of the road segment speed is updated minute by minute, so as to update a traveling route planned by using the road segment weight updated minute by minute.

Figure 10:
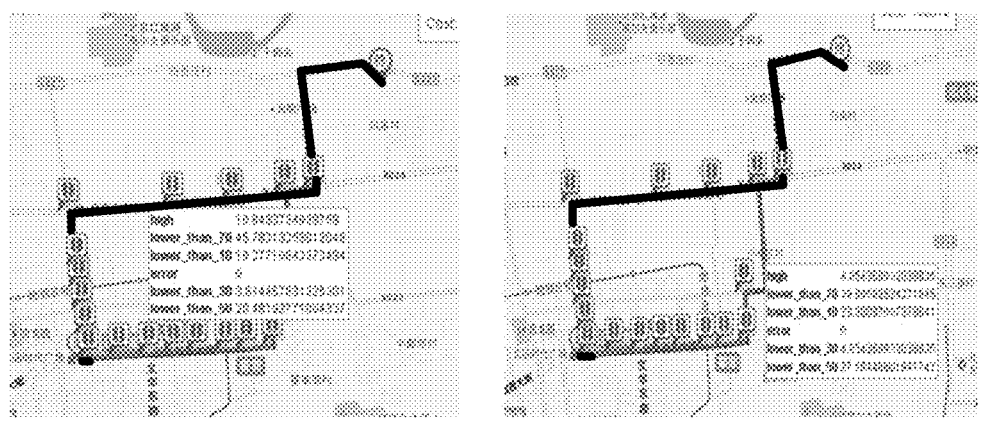
FIG. 10 is an exemplary diagram of an application of performing route calculation by using a road segment weight in a mobile phone map according to an embodiment of this application.

In an embodiment, FIG. 10 shows an application example of performing a route calculation in a mobile phone map by using a road segment weight according to an embodiment of the present application. In a road segment, as shown by a black thick solid line, with a predicted road segment speed according to an embodiment of the present application, a road segment speed greater than 70% of a speed limit accounts for 10.84% and a road segment speed greater than 50% of the speed limit and less than 70% of the speed limit accounts for 45.78%, which are both higher than cases in which the percentages of the road segment speed greater than 70% and 50% are respectively 4.85% and 39.80% of a related solution, as shown by a black thick dashed line. The related solution may use a real-time road segment speed. Moreover, for a low-speed road segment, in the road segment with a predicted road segment speed, a road segment speed less than 30% of a speed limit accounts for 3.61%, and a road segment speed less than 10% of the speed limit accounts for 20.48%, which are lower than cases in which the percentages of the road segment speed less than 30% and 10% are respectively 4.85% and 27.18% of the related solution. In view of the above, performing route calculation by using a predicted road segment speed in the future is more proper.

In addition, in the route calculation logic, an original route service may use logic of reading a weight in a current minute. After the predicting road segment speed is added, in an embodiment of this application, the logic may be changed to accumulating times of passing road segments, and during route calculation, reading a weight corresponding to the road segment at a moment after the accumulated times for calculation. An accumulated time may start from a starting position and is accumulated with passing times road segment by road segment, and a passing time of a road segment may be obtained by dividing a road segment length by a predicted road segment speed.

A road segment speed prediction apparatus provided according to an embodiment of this application is described below. The road segment speed prediction apparatus described below may be considered as program modules that need to be set by a server for implementing the road segment speed prediction method provided by the embodiments of this application. Mutual reference may be made between the road segment speed prediction apparatus described below and the road segment speed prediction method described above.

Figure 11:
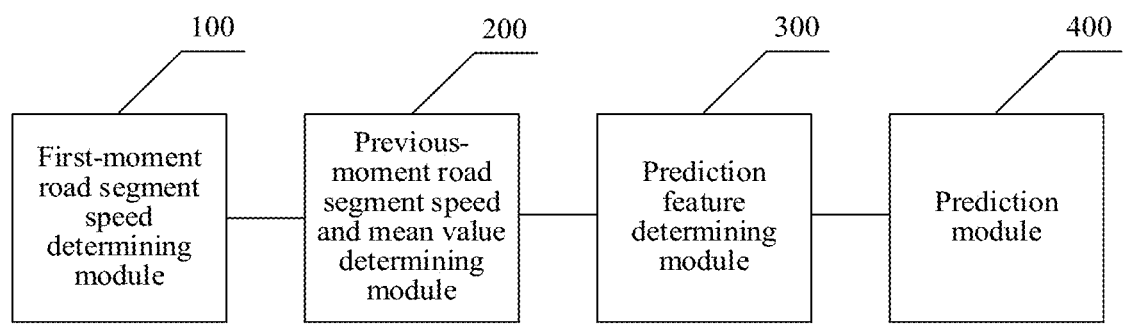
FIG. 11 is a structural block diagram of a road segment speed prediction apparatus according to an embodiment of this application.

FIG. 11 is a structural block diagram of a road segment speed prediction apparatus according to an embodiment of this application. The apparatus may be applied to the server, and referring to FIG. 11, the apparatus may include:

a first-moment road segment speed determining module 100, configured to determine a road segment speed of a target road segment at a first moment;

a previous-moment road segment speed and mean value determining module 200, configured to determine a road segment speed of the target road segment at each set moment before the first moment and a historical road segment speed mean value of the target road segment before the first moment;

a prediction feature determining module 300, configured to determine a corresponding road segment speed prediction feature of the target road segment at a second moment at least according to the road segment speed of the target road segment at the first moment, the road segment speed of the target road segment at each set moment before the first moment, and the historical road segment speed mean value of the target road segment before the first moment, the second moment being a future moment posterior to the first moment and having a predetermined time difference from the first moment; and a prediction module 400, configured to predict a road segment speed of the target road segment at the second moment according to the road segment speed prediction feature and a pre-trained road segment speed prediction model.

Figure 12:
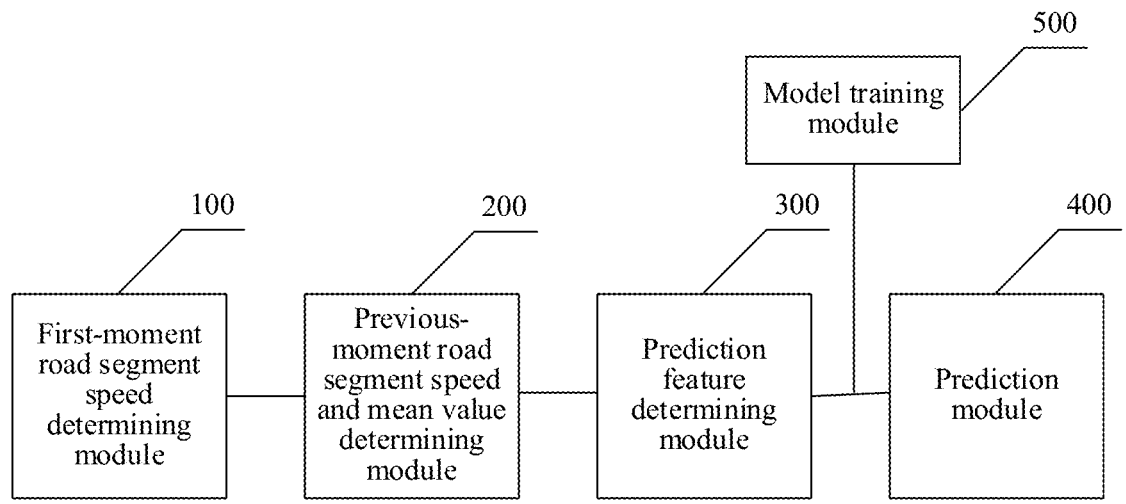
FIG. 12 is a structural block diagram of a road segment speed prediction apparatus according to an embodiment of this application.

FIG. 12 is a structural block diagram of a road segment speed prediction apparatus according to an embodiment of this application. With reference to FIG. 11 and FIG. 12, the apparatus may further include:

a model training module 500, configured to determine a road segment speed prediction training feature of the target road segment at each moment of each time cycle of a set time limit, to obtain a plurality of pieces of sample data, one piece of sample data representing a road segment speed prediction training feature of the target road segment at one moment of one time cycle of the set time limit, and the road segment speed prediction training feature of the target road segment at one moment of one time cycle of the set time limit at least including: a road segment speed of the target road segment in the one moment of the one time cycle of the set time limit and a road segment speed of the target road segment at each set moment before the one moment and historical road segment speed mean value of the target road segment before the one moment; and obtain the road segment speed prediction model by training according to a machine learning algorithm and the plurality of pieces of sample data.

In an embodiment, the road segment speed prediction training feature of the target road segment in one moment of one time cycle of the set time limit further includes:

a speed clustering interval of the road segment speed of the target road segment at the one moment of the one time cycle, a previous speed clustering interval and a next speed clustering interval thereof, a time of the one moment, a time at which the target road segment enters the speed clustering interval of the road segment speed, a duration during which the target road segment is in the speed clustering interval of the road segment speed, and a road segment feature of the target road segment.

The prediction feature determining module 300 that is configured to determine a corresponding road segment speed prediction feature of the target road segment at a second moment at least according to the road segment speed of the target road segment at the first moment, the road segment speed of the target road segment at each set moment before the first moment, and the historical road segment speed mean value of the target road segment before the first moment specifically includes:

determining the corresponding road segment speed prediction feature of the target road segment at the second moment according to the road segment speed of the target road segment at the first moment, the road segment speed of the target road segment at each set moment before the first moment, the historical road segment speed mean value of the target road segment before the first moment, a target speed clustering interval of the road segment speed of the target road segment at the first moment, a previous speed clustering interval and a next speed clustering interval thereof, a time point at which the target road segment enters the target speed clustering interval, a duration during which the target road segment is in the target speed clustering interval, a time point of the first moment, and the road segment feature of the target road segment.

Figure 13:
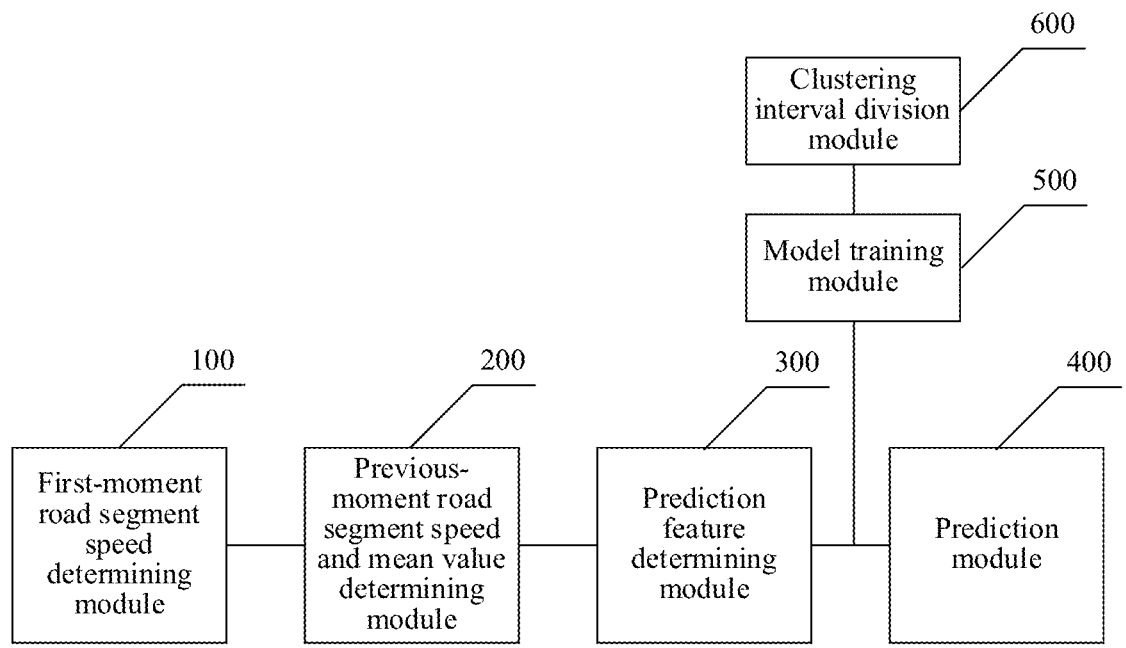
FIG. 13 is a structural block diagram of a road segment speed prediction apparatus according to an embodiment of this application.

FIG. 13 shows still a structural block diagram of a road segment speed prediction apparatus according to an embodiment of this application. With reference to FIG. 12 and FIG. 13, the apparatus may further include:

a clustering interval division module 600, configured to determine a historical road segment speed mean value of the target road segment at each moment; and cluster the historical road segment speed mean value of the target road segment at each moment a plurality of times until a center of each speed clustering interval after clustering is the same as a center of each speed clustering interval of previous clustering, to obtain k speed clustering intervals, k being a set value.

In an embodiment, the clustering interval division module 600 that is configured to cluster the historical road segment speed mean value of the target road segment at each moment a plurality of times until a center of each speed clustering interval after clustering is the same as a center of each speed clustering interval of previous clustering further includes:

randomly selecting historical road segment speed mean values at k moments as initial centers of k speed clustering intervals;

for a historical road segment speed mean value at any remaining moment, determining at least one initial center temporally connected to the remaining moment in the respective initial centers, determining a dissimilarity between the historical road segment speed mean value in the remaining moment and each temporally connected initial center, and clustering the historical road segment speed mean value at the remaining moment into a speed clustering interval corresponding to an initial center that has a lowest dissimilarity and that is temporally connected thereto, to obtain an initial speed clustering interval;

determining a center of each initial speed clustering interval, and re-clustering a historical road segment speed mean value at each moment according to a dissimilarity between the historical road segment speed mean value at each moment and each temporally connected center, to obtain a re-clustered speed clustering interval; and re-clustering the historical road segment speed in each moment by using a center of each speed clustering interval of previous clustering until a center of each re-clustered speed clustering interval is the same as the center of each speed clustering interval of previous clustering.

Figure 14:
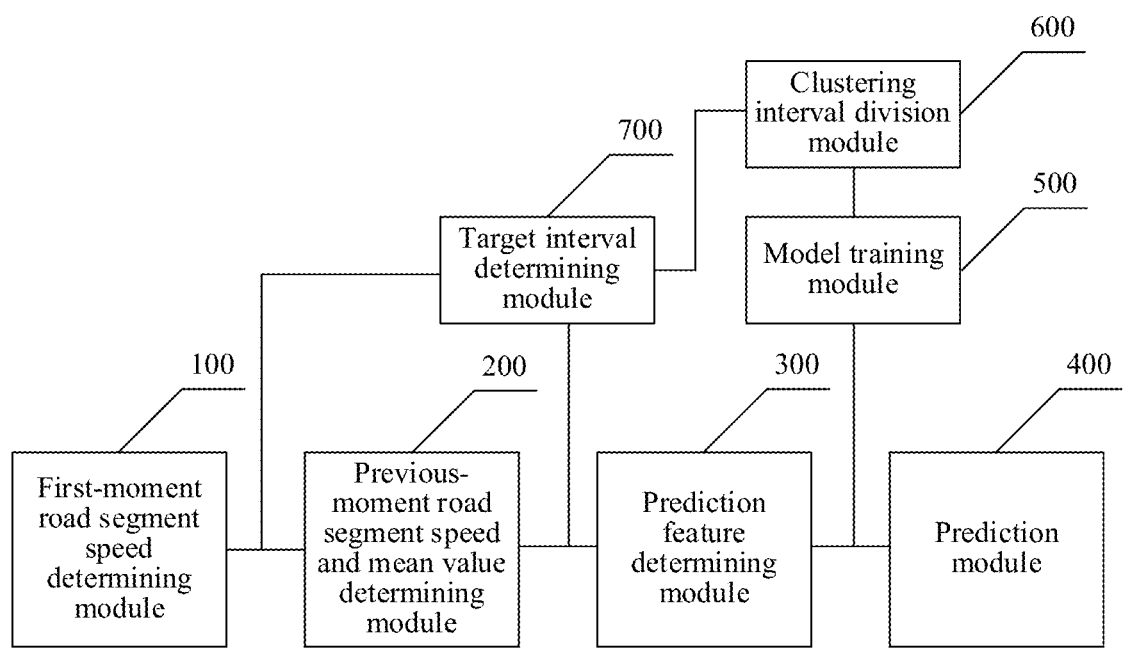
FIG. 14 is a structural block diagram of a road segment speed prediction apparatus according to an embodiment of this application.

A speed clustering interval may include a time period dimension and a road segment speed dimension. FIG. 14 shows a structural block diagram of a road segment speed prediction apparatus according to an embodiment of this application. With reference to FIG. 13 and FIG. 14, the apparatus may further include:

a target interval determining module 700, configured to determine a speed clustering interval whose a time period dimension matches the first moment, to obtain a target speed clustering interval of the road segment speed of the target road segment at the first moment.

Figure 15:
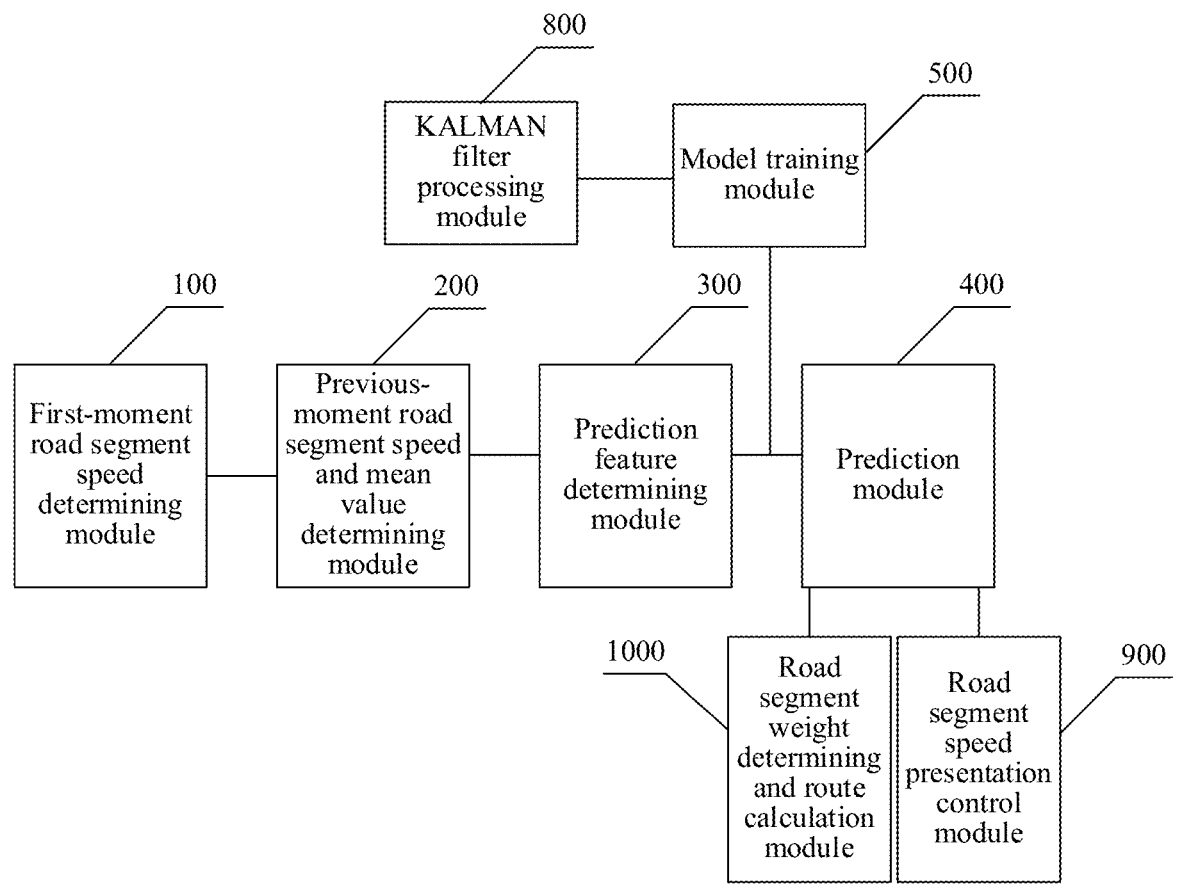
FIG. 15 is a structural block diagram of a road segment speed prediction apparatus according to an embodiment of this application.

FIG. 15 shows a structural block diagram of a road segment speed prediction apparatus according to an embodiment of this application. With reference to FIG. 12 and FIG. 15, the apparatus may further include:

a Kalman filter processing module 800, configured to: for one piece of sample data, compare a road segment speed in a corresponding moment in the sample data predicted by using a road segment speed prediction model with a real road segment speed in the corresponding moment in the sample data, determine the sample data as noise when a difference after comparison is greater than a difference threshold, and perform smoothing on the noise by using a Kalman filter.

Further, as shown in FIG. 15, the road segment speed prediction apparatus provided in an embodiment of this application may further include:

a road segment speed presentation control module 900, configured to determine the target road segment according to a road segment identifier of the target road segment from a plurality of road segments presented on a map, and associate the predicted road segment speed of the target road segment at the second moment that is in the future with the target road segment presented on the map, so that when the target road segment is presented on the map, the road segment speed of the target road segment at the second moment that is in the feature is presented, each road segment presented on the map corresponding to a unique road segment identifier; and/or a road segment weight determining and route calculation module 1000, configured to divide a road segment length of the target road segment by the predicted road segment speed, to obtain a road segment weight of the target road segment at the second moment that is in the future, determine the target road segment as an advantageous road segment in a road network when the road segment weight of the target road segment at the second moment that is in the future is greater than a preset weight threshold, determine the target road segment presented on the map according to the road segment identifier of the target road segment, and add the target road segment presented on the map to a traveling route planned on the map.

The road segment weight of the target road segment at the second moment that is in the future may be used for route calculation.

In an embodiment, the road segment speed presentation control module 900 and the road segment weight determining and route calculation module 1000 may be used in an alternative way.

Figure 16:
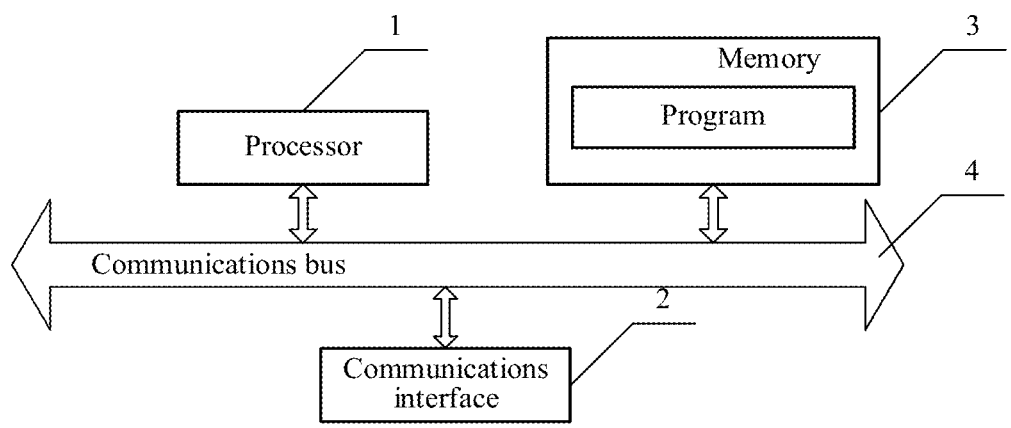
FIG. 16 is a block diagram of a hardware structure of a server according to an embodiment of this application.

The embodiments of this application further provide a server. The server may be loaded with corresponding program modules of the road segment speed prediction apparatus described above, to implement a segment speed prediction function. A hardware structure the server may, as shown in FIG. 16, include: at least one processor 1, at least one communications interface 2, at least one memory 3, and at least one communications bus 4.

In an embodiment of this application, a quantity of each of the processor 1, the communications interface 2, the memory 3, and the communications bus 4 is at least one, and communication among the processor 1, the communications interface 2, and the memory 3 is implemented by using the communications bus 4.

The processor 1 may be a Central Processing Unit (CPU) or an Application-Specific Integrated Circuit (ASIC) or may be configured as one or more integrated circuits for implementing the embodiments of the present application.

The memory 3 may be a non-transitory computer readable medium that includes a high-speed RAM memory, or may include a non-volatile memory (non-volatile memory), for example, at least one magnetic disk storage.

The memory 3 stores a program applicable to the processor 1, and the program is used to:

determine a road segment speed of a target road segment in a first moment;

determine a road segment speed of the target road segment at each set moment before the first moment and a historical road segment speed mean value of the target road segment before the first moment;

determine a corresponding road segment speed prediction feature of the target road segment at a second moment at least according to the road segment speed of the target road segment at the first moment, the road segment speed of the target road segment at each set moment before the first moment, and the historical road segment speed mean value of the target road segment before the first moment, the second moment being a future moment posterior to the first moment and having a predetermined time difference from the first moment; and predict a road segment speed of the target road segment at the second moment according to the road segment speed prediction feature and a pre-trained road segment speed prediction model.

In an embodiment, the descriptions above describe subdivided functions and extended functions of the program The embodiments of this application further provide a storage medium, the storage medium storing an executable program, and the program being used to:

determine a road segment speed of a target road segment at a first moment;

determine a road segment speed of the target road segment at each set moment before the first moment and a historical road segment speed mean value of the target road segment before the first moment;

determine a corresponding road segment speed prediction feature of the target road segment at a second moment at least according to the road segment speed of the target road segment at the first moment, the road segment speed of the target road segment at each set moment before the first moment, and the historical road segment speed mean value of the target road segment before the first moment, the second moment being a future moment posterior to the first moment and having a predetermined time difference from the first moment; and predict a road segment speed of the target road segment at the second moment according to the road segment speed prediction feature and a pre-trained road segment speed prediction model.

The embodiments of this application provide a computer program product including instructions, running on a computer, causing the computer to perform the road segment prediction method provided in the embodiments of this application.

The embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

A person skilled in the art may further realize that, in combination with the embodiments herein, units and algorithm, steps of each example described can be implemented with electronic hardware, computer software, or the combination thereof. To describe the interchangeability between the hardware and the software, compositions and steps of each example have been generally described according to functions in the foregoing descriptions. Whether the functions are performed by hardware or software depends on particular applications and design constraint conditions of the technical solutions. A person skilled in the art may use different methods to implement the described functions for each particular application, but it is not to be considered that the implementation goes beyond the scope of this application.

In combination with the embodiments herein, steps of the method or algorithm described may be directly implemented using hardware, a software module executed by a processor, or the combination thereof. The software module may be placed in a non-transitory computer readable medium. Specifically, the software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms in the technical field.

The foregoing description of the disclosed embodiments enables a person skilled in the art to implement or use the present embodiments. Various modifications to the embodiments are obvious to the person skilled in the art, and general principles defined in this specification may be implemented in other embodiments without departing from the spirit or scope of the present disclosure. Therefore, the present application is not limited to these embodiments illustrated in the present disclosure, but needs to conform to the broadest scope consistent with the principles and novel features disclosed in the present disclosure.

What is claimed is:

1. A method of predicting a moving speed on a target road segment, the method comprising:

obtaining a first moving speed on the target road segment at a first time point;

obtaining a plurality of second moving speeds on the target road segment at each of a plurality of time points before the first time point;

obtaining a mean historical speed on the target road segment at the first time point during previous time cycles;

determining a speed prediction feature of the target road segment at a second time point based on the first moving speed, the plurality of second moving speeds, the mean historical speed on the target road segment at the first time point during the previous time cycles, a target speed clustering interval on the target road segment at the first time point, and a third time point at which the target road segment enters the target speed clustering interval, the second time point being subsequent to the first time point;

predicting the moving speed on the target road segment at the second time point by inputting, into a pre-trained road segment speed prediction model, the first moving speed, the plurality of second moving speeds, the mean historical speed on the target road segment at the first time point during the previous time cycles, the target speed clustering interval, and the third time point at which the target road segment enters the target speed clustering interval of the speed prediction feature of the target road segment at the second time point; and outputting the predicted moving speed on the target road segment at the second time point to a travel route calculation.

2. The method according to claim 1, further comprising:

determining a speed prediction training feature of the target road segment at each of a plurality of time points in a plurality of time cycles of a time range;

obtaining a plurality of pieces of sample data based on the determined speed prediction training features of the target road segment, each of the plurality of pieces of sample data representing the speed prediction training feature of the target road segment at one of the plurality of time points in the plurality of the time cycles of the time range; and training the road segment speed prediction model according to a machine learning algorithm and the plurality of pieces of sample data, wherein the speed prediction training feature of the target road segment at the one of the plurality of time points in one of the plurality of time cycles includes a speed on the target road segment at the one of the plurality of time points, a speed on the target road segment at each of a subset of the plurality of time points before the one of the plurality of time points, and a mean historical speed on the target road segment at the one of the plurality of time points during the one of the plurality of time cycles.

3. The method according to claim 2, wherein the speed prediction training feature of the target road segment at the one of the plurality of time points includes a speed clustering interval on the target road segment at the one of the plurality of time points, a previous speed clustering interval and a next speed clustering interval of the speed clustering interval, a time point at which the target road segment enters the speed clustering interval, a duration during which the target road segment is in the speed clustering interval, and a road segment feature of the target road segment.

4. The method according to claim 1, wherein the determining the speed prediction feature of the target road segment at the second time point further comprises:

determining the speed prediction feature of the target road segment at the second time point based on previous speed clustering interval and a next speed clustering interval of the target speed clustering interval, a duration during which the target road segment is in the target speed clustering interval, and a road segment feature of the target road segment.

5. The method according to claim 4, further comprising:

determining a mean historical speed on the target road segment for each of the plurality of time points; and clustering the mean historical speed on the target road segment for each of the plurality of time points a plurality of times until a center of each speed clustering interval is the same as a center of a previous speed clustering interval.

6. The method according to claim 5, wherein the clustering further comprises:

randomly selecting the mean historical speed on the target road segment at k time points as initial centers of k speed clustering intervals;

for the mean historical speed for each of a plurality of remaining time points, determining at least one of the initial centers temporally connected to the respective remaining time point, determining a dissimilarity between the mean historical speed at the respective remaining time point and the at least one of the initial centers, and clustering the mean historical speed at the respective remaining time point into the speed clustering interval corresponding to one of the at least one of the initial centers that has a lowest dissimilarity among the determined dissimilarities corresponding to the at least one of the initial centers;

adjusting the initial centers based on the clustered mean historical speed at each of the plurality of remaining time points;

re-clustering the mean historical speed at each of the plurality of time points based on the adjusted initial centers; and re-clustering the mean historical speed at each of the plurality of time points by using a center of each speed clustering interval of previous clustering until a center of each re-clustered speed clustering interval is the same as the center of each speed clustering interval of the previous clustering.

7. The method according to claim 5, wherein each of the speed clustering intervals is defined by a time period and a road segment speed, and the target speed clustering interval on the target road segment at the first time point is one of the speed clustering intervals which has a time period that includes the first time point.

8. The method according to claim 2, further comprising:

for one piece of the plurality of pieces of sample data, comparing a road segment speed at a corresponding time point in the sample data predicted using the pre-trained road segment speed prediction model with a real road segment speed at the corresponding time point in the sample data; and determining the one piece of the plurality of pieces of sample data as noise when a difference between the road segment speed at the corresponding time point in the sample data predicted using the pre-trained road segment speed prediction model and the real road segment speed at the corresponding time point in the sample data is greater than a threshold, and performing smoothing on the noise by using a Kalman filter.

9. The method according to claim 1, further comprising:

determining the target road segment according to a road segment identifier of the target road segment from a plurality of road segments presented on a map, and associating the predicted moving speed on the target road segment at the second time point with the target road segment;

determining a road segment weight of the target road segment at the second time point by dividing a road segment length of the target road segment by the predicted moving speed on the target road segment at the second time point;

determining the target road segment as an advantageous road segment in a road network when the road segment weight of the target road segment at the second time point is greater than a threshold; and adding the target road segment presented on the map to a traveling route.

10. A road segment speed prediction apparatus, comprising:

processing circuitry configured to obtain a first moving speed on a target road segment at a first time point;

obtain a plurality of second moving speeds on the target road segment at each of a plurality of time points before the first time point;

obtain a mean historical speed on the target road segment at the first time point during previous time cycles;

determine a speed prediction feature of the target road segment at a second time point based on the first moving speed, the plurality of second moving speeds, the mean historical speed on the target road segment at the first time point during the previous time cycles, a target speed clustering interval on the target road segment at the first time point, and a third time point at which the target road segment enters the target speed clustering interval, the second time point being subsequent to the first time point;

predict a moving speed on the target road segment at the second time point by inputting, into a pre-trained road segment speed prediction model, the first moving speed, the plurality of second moving speeds, the mean historical speed on the target road segment at the first time point during the previous time cycles, the target speed clustering interval, and the third time point at which the target road segment enters the target speed clustering interval of the speed prediction feature of the target road segment at the second time point; and output the predicted moving speed on the target road segment at the second time point to a travel route calculation.

11. The road segment speed prediction apparatus according to claim 10, wherein the processing circuitry is further configured to determine a speed prediction training feature of the target road segment at each of a plurality of time points in a plurality of time cycles of a time range, obtain a plurality of pieces of sample data based on the determined speed prediction training features of the target road segment, each of the plurality of pieces of sample data representing the speed prediction training feature of the target road segment at one of the plurality of time points in the plurality of the time cycles of the time range, and train the road segment speed prediction model according to a machine learning algorithm and the plurality of pieces of sample data, and the speed prediction training feature of the target road segment at the one of the plurality of time points in one of the plurality of time cycles includes a speed on the target road segment at the one of the plurality of time points, a speed on the target road segment at each of a subset of the plurality of time points before the one of the plurality of time points, and a mean historical speed on the target road segment at the one of the plurality of time points during the one of the plurality of time cycles.

12. The road segment speed prediction apparatus according to claim 11, wherein the speed prediction training feature on the target road segment at the one of the plurality of time points includes a speed clustering interval on the target road segment at the one of the plurality of time points, a previous speed clustering interval and a next speed clustering interval of the speed clustering interval, a time point at which the target road segment enters the speed clustering interval, a duration during which the target road segment is in the speed clustering interval, and a road segment feature of the target road segment, and the processing circuitry is further configured to determine the speed prediction feature of the target road segment at the second time point based on a previous speed clustering interval and a next speed clustering interval of the target speed clustering interval, a duration during which the target road segment is in the target speed clustering interval, and a road segment feature of the target road segment.

13. The road segment speed prediction apparatus according to claim 11, wherein the processing circuitry is further configured to determine the target road segment according to a road segment identifier of the target road segment from a plurality of road segments presented on a map, and associate the predicted moving speed on the target road segment at the second time point with the target road segment;

determine a road segment weight of the target road segment at the second time point by dividing a road segment length of the target road segment by the predicted moving speed on the target road segment at the second time point;

determine the target road segment as an advantageous road segment in a road network when the road segment weight of the target road segment at the second time point is greater than a threshold; and add the target road segment presented on the map to a traveling route.

14. A server, comprising:

a memory coupled to processing circuitry, the processing circuitry configured to obtain a first moving speed on a target road segment at a first time point;

obtain a plurality of second moving speeds on the target road segment at each of a plurality of time points before the first time point;

obtain a mean historical speed on the target road segment at the first time point during previous time cycles;

determine a speed prediction feature of the target road segment at a second time point based on the first moving speed, the plurality of second moving speeds, the mean historical speed on the target road segment at the first time point during the previous time cycles, a target speed clustering interval on the target road segment at the first time point, and a third time point at which the target road segment enters the target speed clustering interval, the second time point being subsequent to the first time point;

predict a moving speed on the target road segment at the second time point by inputting, into a pre-trained road segment speed prediction model, the first moving speed, the plurality of second moving speeds, the mean historical speed on the target road segment at the first time point during the previous time cycles, the target speed clustering interval, and the third time point at which the target road segment enters the target speed clustering interval of the speed prediction feature of the target road segment at the second time point; and output the predicted moving speed on the target road segment at the second time point to a travel route calculation.

15. The server of claim 14, wherein
the processing circuitry is further configured to
determine a speed prediction training feature of the target road segment at each of a plurality of time points in a plurality of time cycles of a time range;
obtain a plurality of pieces of sample data based on the determined speed prediction training features of the target road segment, each of the plurality of pieces of sample data representing the speed prediction training feature of the target road segment at one of the plurality of time points in the plurality of the time cycles of the time range; and
train the road segment speed prediction model according to a machine learning algorithm and the plurality of pieces of sample data, and
the speed prediction training feature of the target road segment at the one of the plurality of time points during one of the plurality of time cycles includes a speed on the target road segment at the one of the plurality of time points, a speed on the target road segment at each of a subset of the plurality of time points before the one of the plurality of time points, and a mean historical speed on the target road segment at the one of the plurality of time points during the one of the plurality of time cycles.

16. The server of claim 15, wherein
the speed prediction training feature on the target road segment at the one of the plurality of time points includes a speed clustering interval on the target road segment at the one of the plurality of time points, a previous speed clustering interval and a next speed clustering interval of the speed clustering interval, a time point at which the target road segment enters the speed clustering interval, a duration during which the target road segment is in the speed clustering interval, and a road segment feature of the target road segment.

17. The server of claim 14, wherein the processing circuitry is further configured to
determine the speed prediction feature of the target road segment at the second time point based on a previous speed clustering interval and a next speed clustering interval of the target speed clustering interval, a duration during which the target road segment is in the target speed clustering interval, and a road segment feature of the target road segment.

18. A non-transitory computer-readable medium storing instructions which, when executed by a computer, cause the computer to perform:
obtaining a first moving speed on a target road segment at a first time point;
obtaining a plurality of second moving speeds on the target road segment at each of a plurality of time points before the first time point;
obtaining a mean historical speed on the target road segment at the first time point during previous time cycles;
determining a speed prediction feature of the target road segment at a second time point based on the first moving speed, the plurality of second moving speeds, the mean historical speed on the target road segment at the first time point during the previous time cycles, a target speed clustering interval on the target road segment at the first time point, and a third time point at which the target road segment enters the target speed clustering interval, the second time point being subsequent to the first time point;
predicting a moving speed on the target road segment at the second time point by inputting, into a pre-trained road segment speed prediction model, the first moving speed, the plurality of second moving speeds, the mean historical speed on the target road segment at the first time point during the previous time cycles, the target speed clustering interval, and the third time point at which the target road segment enters the target speed clustering interval of the speed prediction feature of the target road segment at the second time point; and
outputting the predicted moving speed on the target road segment at the second time point to a travel route calculation.

19. The non-transitory computer-readable medium of claim 18, the instructions further causing the computer to perform:
determining a speed prediction training feature of the target road segment at each of a plurality of time points in a plurality of time cycles of a time range;
obtaining a plurality of pieces of sample data based on the determined speed prediction training features of the target road segment, each of the plurality of pieces of sample data representing the speed prediction training feature of the target road segment at one of the plurality of time points in the plurality of the time cycles of the time range; and
training the road segment speed prediction model according to a machine learning algorithm and the plurality of pieces of sample data, wherein
the speed prediction training feature of the target road segment at the one of the plurality of time points in one of the plurality of time cycles includes a speed on the target road segment at the one of the plurality of time points, a speed on the target road segment at each of a subset of the plurality of time points before the one of the plurality of time points, and a mean historical speed on the target road segment at the one of the plurality of time points during the one of the plurality of time cycles.

20. The non-transitory computer-readable medium of claim 19, wherein
the speed prediction training feature on the target road segment at the one of the plurality of time points includes a speed clustering interval on the target road segment at the one of the plurality of time points, a previous speed clustering interval and a next speed clustering interval of the speed clustering interval, a time point at which the target road segment enters the speed clustering interval, a duration during which the target road segment is in the speed clustering interval, and a road segment feature of the target road segment.

* * * * *